US006669128B2

(12) United States Patent
Appleby et al.

(10) Patent No.: US 6,669,128 B2
(45) Date of Patent: Dec. 30, 2003

(54) METHOD AND APPARATUS FOR AUTOMATICALLY FORMING A COILED SEGMENT OF OPTICAL FIBER

(75) Inventors: Jon H. Appleby, Boston, MA (US); Mark J. McCann, Plaistow, NH (US); Andre Sharon, Newton Centre, MA (US); Bretton E. Anderson, Atkinson, NH (US)

(73) Assignee: Ksaria Corporation, Wilmington, MA (US)

( * ) Notice: Subject to any disclaimer, the term of this patent is extended or adjusted under 35 U.S.C. 154(b) by 12 days.

(21) Appl. No.: 09/900,712

(22) Filed: Jul. 6, 2001

(65) Prior Publication Data

US 2003/0006332 A1 Jan. 9, 2003

(51) Int. Cl.⁷ .......................... B21C 47/24; B65H 54/00
(52) U.S. Cl. ................. 242/362.2; 242/363; 242/475.7; 242/613.3
(58) Field of Search .................. 242/362.2, 362.3, 242/363, 129, 613.3, 437.4, 475.7, 443

(56) References Cited

U.S. PATENT DOCUMENTS

| | | | | |
|---|---|---|---|---|
| 1,475,436 A | * | 11/1923 | Kilmer et al. | 242/362.3 X |
| 1,489,591 A | * | 4/1924 | Catlett et al. | 242/129 |
| 3,204,334 A | | 9/1965 | Long et al. | |
| 3,283,398 A | | 11/1966 | Andren | |
| 3,456,324 A | | 7/1969 | Hahn et al. | |
| 3,536,274 A | * | 10/1970 | Tommarello et al. | 242/362.2 X |
| 3,542,307 A | * | 11/1970 | Schuetz et al. | 242/362.2 |
| 3,703,954 A | | 11/1972 | Gudmestad | |
| 3,735,938 A | * | 5/1973 | Coopman | 242/363 |
| 3,909,900 A | | 10/1975 | Gudmestad | |
| 3,973,600 A | | 8/1976 | Choromokos | |
| 4,175,316 A | | 11/1979 | Gudmestad | |
| 4,336,047 A | | 6/1982 | Pavlopoulos et al. | |
| 4,350,311 A | * | 9/1982 | Pokhodnya et al. | 242/362.1 |
| 4,440,053 A | | 4/1984 | Suzuki et al. | |
| 4,518,129 A | * | 5/1985 | Cote et al. | 242/362.2 |
| 4,763,272 A | | 8/1988 | McLandrich | |
| 4,916,811 A | | 4/1990 | Uehara et al. | |
| 5,208,977 A | | 5/1993 | Ricard | |
| 5,386,490 A | | 1/1995 | Pan et al. | |
| 5,770,001 A | | 6/1998 | Nagayama et al. | |
| 5,926,594 A | | 7/1999 | Song et al. | |
| 5,970,749 A | | 10/1999 | Bloom | |
| 6,003,341 A | | 12/1999 | Bloom | |
| 6,122,936 A | | 9/2000 | Csipkes et al. | |
| 6,237,370 B1 | | 5/2001 | Bloom | |

FOREIGN PATENT DOCUMENTS

WO    WO 9711917    4/1997

* cited by examiner

Primary Examiner—Michael R. Mansen
(74) Attorney, Agent, or Firm—Wolf, Greenfield & Sacks, P.C.

(57) ABSTRACT

Methods and apparatus for automatically processing an optical fiber to create a fiber coil. In one embodiment, the fiber is wound about a continuously curved winding surface. In another embodiment, the winding surface ensures that a minimum bending radius of the optical fiber is not violated. In another embodiment, the fiber is wound about a rotating winding surface including a gripper spaced from the winding surface and rotatable therewith. In another embodiment, the coil is transferred to a transport medium comprising an engagement feature that engages the coil. In another embodiment, the coil is stripped from the winding surface and inserted in the transport medium without gripping the fiber. In another embodiment, the fiber is wound about a mandrel and stripped by moving the coil relative to the mandrel axis. In other embodiments, the coil is stripped by applying equal stripping force to the coil about an entire circumference of the winding surface, and/or by contacting the coil with a stripper that has a contour that matches a contour of the winding surface. In another embodiment, the coil is moved in a single direction to strip it from the winding surface and insert it in the transport medium. In another embodiment, at least one of the winding surface and the transport medium is moved toward the other to facilitate transferring the coil.

67 Claims, 15 Drawing Sheets

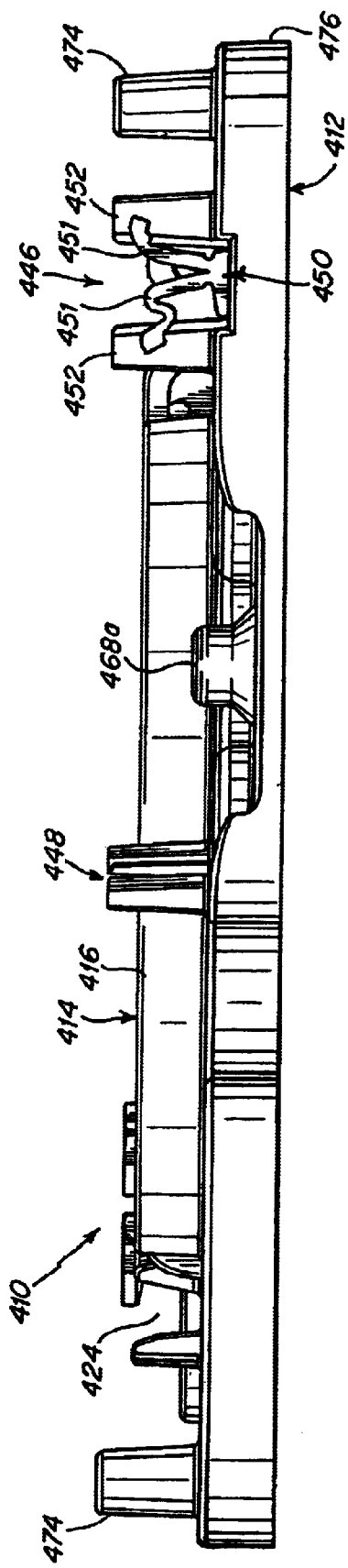
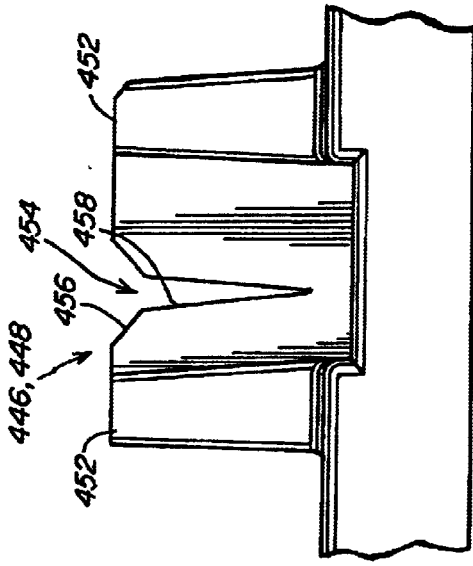
Fig. 20
Fig. 21

METHOD AND APPARATUS FOR AUTOMATICALLY FORMING A COILED SEGMENT OF OPTICAL FIBER

FIELD OF THE INVENTION

The present invention relates to optical fibers, and more particularly, to methods and apparatus for automating the formation of coiled segments of optical fibers, to be used, for example, in forming connectors for interconnecting optical devices and components.

DESCRIPTION OF RELATED ART

Optical devices are becoming increasingly popular, particularly for use in networking applications. In an optical network or other optical circuit, optical devices are interconnected via optical fibers, which serve as the transmission media for transmitting information between the devices. Similarly, an optical device is often made up of multiple optical components that are interconnected, internally within the device, via optical fibers.

The conventional technique for interconnecting multiple optical components within a device is through the use of a pigtail. A pigtail is a length of optical fiber having connectors (referred to as ferrules) attached to its ends. The ferrules provide structural support to the optical fiber, making it easier to connect the fiber with optical components or other optical fibers. Conventionally, pigtails are formed by unwinding the desired length of optical fiber from a large spool of optical fiber, cutting the optical fiber to the desired length, winding the optical fiber to facilitate handling of the fiber in a more compact area, and then attaching the ferrules to both ends, with all of these processes conventionally being done by hand.

One embodiment of the present invention is directed to a method and apparatus for automatically forming a coil of optical fiber.

SUMMARY OF THE INVENTION

One illustrative embodiment of the invention is directed to a method for processing an optical fiber. The method comprises acts of: (A) automatically unwinding a section of optical fiber from a spool of optical fiber; (B) automatically cutting the section of optical fiber to separate the section from the spool; and (C) automatically winding the section of optical fiber about a continuously curved winding surface to form a coil.

Another illustrative embodiment of the invention is directed to an apparatus for processing an optical fiber. The apparatus comprises: a payout assembly to unwind a section of optical fiber from a spool of optical fiber; a cutter to cut the section of optical fiber to separate the section from the spool; and means for automatically winding the section of optical fiber about a continuously curved winding surface to form a coil.

A further illustrative embodiment of the invention is directed to an apparatus for processing an optical fiber. The apparatus comprises: a payout assembly to unwind a section of optical fiber from a spool of optical fiber; a cutter to cut the section of optical fiber to separate the section from the spool; and a winder that winds the section of optical fiber to form a coil, the winder comprising a continuously curved winding surface.

Another illustrative embodiment of the invention is directed to a method for processing an optical fiber. The method comprises acts of: (A) automatically unwinding a section of optical fiber from a spool of optical fiber; (B) automatically cutting the section of optical fiber to separate the section from the spool; and (C) automatically winding the section of optical fiber about a winding surface to form a coil, the winding surface being sized and shaped to ensure that a minimum bending radius of the optical fiber is not violated when the section of optical fiber is wound about the winding surface.

A further illustrative embodiment of the invention is directed to an apparatus comprising: a payout assembly to unwind a section of optical fiber from a spool of optical fiber; a cutter to cut the section of optical fiber to separate the section from the spool; and a winder that winds the section of optical fiber to form a coil, the winder comprising a winding surface that is sized and shaped to ensure that a minimum bending radius of the optical fiber is not violated when the section of optical fiber is wound about the winding surface.

Another illustrative embodiment of the invention is directed to a method for processing an optical fiber. The method comprises acts of: (A) automatically unwinding a section of optical fiber from a spool of optical fiber; (B) automatically cutting the section of optical fiber to separate the section from the spool; and (C) automatically winding the section of optical fiber about a rotating winding surface to form a coil, including an act of gripping the section of optical fiber with a gripper, spaced from the winding surface and rotatable therewith, that winds the fiber about the winding surface.

A further illustrative embodiment is directed to an apparatus comprising: a payout assembly to unwind a section of optical fiber from a spool of optical fiber; a cutter to cut the section of optical fiber to separate the section from the spool; and a winder that winds the section of optical fiber about to form a coil, the winder comprising a rotatable mandrel that comprises a winding surface, and a gripper, spaced from the winding surface, that is rotatable with the mandrel and that grips the section of optical fiber and winds the section of optical fiber about the winding surface.

Another illustrative embodiment is directed to a method for processing an optical fiber, the method comprising acts of: (A) automatically unwinding a section of optical fiber from a spool of optical fiber; (B) automatically cutting the section of optical fiber to separate the section from the spool; (C) automatically winding the section of optical fiber about a winding surface to form a coil having a coiled section and a pair of free ends; and (D) automatically transferring the coil to a transport medium comprising an engagement feature that engages the coiled section to secure the coil to the transport medium.

A further illustrative embodiment is directed to an apparatus comprising: a payout assembly to unwind a section of optical fiber from a spool of optical fiber; a cutter to cut the section of optical fiber to separate the section from the spool; a winder that winds the section of optical fiber about a winding surface to form a coil having a coiled section and a pair of free ends; a stripper that strips the coil from the winding surface; a transport medium; and an inserter that inserts the coil in the transport medium; wherein the transport medium comprises an engagement feature that engages the coiled section to secure the coil to the transport medium.

Another illustrative embodiment is directed to a method for processing an optical fiber, the method comprising acts of: (A) automatically unwinding a section of optical fiber from a spool of optical fiber; (B) automatically cutting the section of optical fiber to separate the section from the spool; (C) automatically winding the section of optical fiber about a winding surface to form a coil; and (D) automatically transferring the coil to a transport medium by automatically stripping the coil from the winding surface and automatically inserting the coil in the transport medium without gripping the section of optical fiber.

A further illustrative embodiment is directed to an apparatus comprising: a payout assembly to unwind a section of optical fiber from a spool of optical fiber; a cutter to cut the section of optical fiber to separate the section from the spool; a winder that winds the section of optical fiber about a winding surface to form a coil; a stripper that strips the coil from the winding surface; and an inserter that inserts the coil in a transport medium; wherein the stripper and the inserter both are gripper-less and have contact surfaces that do not grip the section of optical fiber.

Another illustrative embodiment is directed to a method for processing an optical fiber, the method comprising acts of: (A) automatically unwinding a section of optical fiber from a spool of optical fiber; (B) automatically cutting the section of optical fiber to separate the section from the spool; (C) automatically winding the section of optical fiber about a mandrel to form a coil, wherein the mandrel has an axis; and (D) stripping the coil from the mandrel by moving the coil relative to the mandrel in a direction of the mandrel axis.

A further illustrative embodiment is directed to an apparatus comprising: a payout assembly to unwind a section of optical fiber from a spool of optical fiber; a cutter to cut the section of optical fiber to separate the section from the spool; a winder that winds the section of optical fiber to form a coil, the winder comprising a mandrel about which the section of optical fiber is wound, the mandrel having an axis; and a stripper that strips the coil from the mandrel, wherein the stripper and the mandrel are arranged for relative movement in a direction parallel to the mandrel axis.

Another illustrative embodiment is directed to a method for processing an optical fiber, the method comprising acts of: (A) automatically unwinding a section of optical fiber from a spool of optical fiber; (B) automatically cutting the section of optical fiber to separate the section from the spool; (C) automatically winding the section of optical fiber about a winding surface to form a coil; and (D) automatically stripping the coil from the winding surface by applying equal stripping force to the coil about an entire circumference of the winding surface to strip the coil from the winding surface.

A further illustrative embodiment is directed to an apparatus comprising: a payout assembly to unwind a section of optical fiber from a spool of optical fiber; a cutter to cut the section of optical fiber to separate the section from the spool; a winder that winds the section of optical fiber about a winding surface to form a coil; and a stripper that strips the coil from the winding surface, wherein the stripper is adapted to apply equal stripping force to the coil about an entire circumference of the winding surface.

Another illustrative embodiment of the invention is directed to a method for processing an optical fiber, the method comprising acts of: (A) automatically unwinding a section of optical fiber from a spool of optical fiber; (B) automatically cutting the section of optical fiber to separate the section from the spool; (C) automatically winding the section of optical fiber about a winding surface to form a coil; and (D) automatically stripping the coil from the winding surface by contacting the coil with a stripper that has a contour that matches a contour of the winding surface about an entire circumference of the winding surface.

A further illustrative embodiment of the invention is directed to an apparatus comprising: a payout assembly to unwind a section of optical fiber from a spool of optical fiber; a cutter to cut the section of optical fiber to separate the section from the spool; a winding assembly that comprises a winding surface and a winder that winds the section of optical fiber about the winding surface to form a coil; and a stripper that strips the coil from the winding surface, wherein the stripper has a contour that matches a contour of the winding surface about an entire circumference of the winding surface.

Another illustrative embodiment is directed to a method for processing an optical fiber, the method comprising acts of: (A) automatically unwinding a section of optical fiber from a spool of optical fiber; (B) automatically cutting the section of optical fiber to separate the section from the spool; (C) automatically winding the section of optical fiber about a continuously curved winding surface to form a coil; (D) automatically stripping the coil from the winding surface; and (E) automatically inserting the coil in the transport medium. The acts (D) and (E) comprise an act of moving the coil in a single direction to perform both the acts of automatically stripping the coil from the winding surface and automatically inserting the coil in the transport medium.

A further illustrative embodiment is direct to an apparatus comprising: a payout assembly to unwind a section of optical fiber from a spool of optical fiber; a cutter to cut the section of optical fiber to separate the section from the spool; a winder that winds the section of optical fiber to form a coil, the winder comprising a winding surface; a stripper that strips the coil from the winding surface; and an inserter that inserts the coil in a transport medium. The stripper and the inserter are both movable in a same direction relative to the winding surface.

A further illustrative embodiment is directed to a method for processing an optical fiber, the method comprising acts of: (A) automatically unwinding a section of optical fiber from a spool of optical fiber; (B) automatically cutting the section of optical fiber to separate the section from the spool; (C) automatically winding the section of optical fiber about a winding surface to form a coil; and (D) automatically transferring the coil from the winding surface to a transport medium. The act (D) includes acts of: automatically stripping the coil from the winding surface; automatically moving at least one of the winding surface and the transport medium toward the other to facilitate transferring the coil to the transport medium; and automatically inserting the coil in the transport medium.

Another illustrative embodiment is directed to an apparatus comprising: a payout assembly to unwind a section of optical fiber from a spool of optical fiber; a cutter to cut the section of optical fiber to separate the section from the spool; a winder that winds the section of optical fiber to form a coil, the winder comprising a winding surface; a stripper that strips the coil from the winding surface; an inserter that inserts the coil in a transport medium; and means for moving at least one of the winding surface and the transport medium toward the other to facilitate transferring the coil from the winding surface to the transport medium.

A further illustrative embodiment is directed to an apparatus comprising: a payout assembly to unwind a section of optical fiber from a spool of optical fiber; a cutter to cut the section of optical fiber to separate the section from the spool; a winder that winds the section of optical fiber to form a coil, the winder comprising a winding surface; a stripper that strips the coil from the winding surface; an inserter that inserts the coil in a transport medium; and a base to support the transport medium. At least one of the winding surface and the base is movable toward the other to facilitate transferring the coil to the transport medium.

BRIEF DESCRIPTION OF THE DRAWINGS

FIG. 20 is a side elevational view of the tray of FIG. 15 illustrating one embodiment of a fiber retainer; and FIG. 21 is a schematic view of another illustrative embodiment of a fiber retainer.

DETAILED DESCRIPTION

As mentioned above, conventional techniques for forming a coil of optical fiber, whether in the creation of a pigtail or otherwise, are manual, and are very labor intensive and therefore expensive. One embodiment of the present invention is directed to a method and apparatus for automating the process of forming a coil of optical fiber, whether for use in forming a pigtail or otherwise. It should be appreciated that this can be done in any of numerous ways, and that the present invention is not limited to the particular techniques described below.

Figure 1:
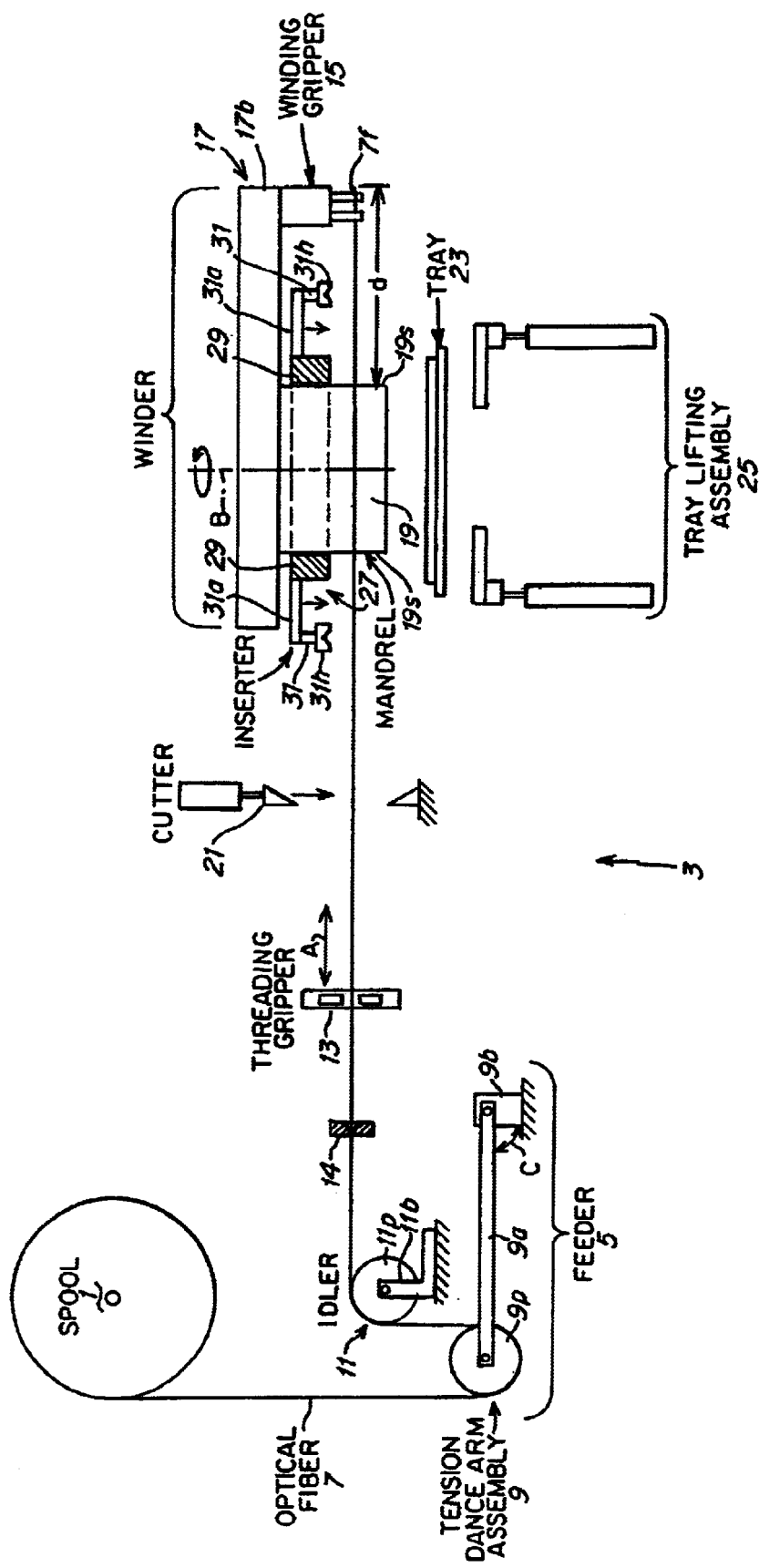
FIG. 1 is a conceptual illustration of a system for automatically generating a coiled section of optical fiber in accordance with one illustrative embodiment of the present invention.

FIG. 1 is a schematic illustration of one illustrative embodiment of the present invention for automating the process of taking a section of optical fiber from a spool 1 of optical fiber, cutting it to size and forming a coil with the section of optical fiber. The system 3 shown in FIG. 1 includes a feeder 5 that is adapted to take the optical fiber 7 off of the spool 1 and feed it to the remainder of the system. A goal of the feeder 5 is to not only take the optical fiber 7 off of the spool 1, but to maintain constant tension in the optical fiber as it is taken off the spool, to facilitate handling. This can be done in any of numerous ways, including using techniques that have been employed in the past in the handling of other types of spooled cables, wires, threads, etc., as the present invention is not limited to using any particular feeding mechanism.

In the illustrative embodiment shown in FIG. 1, the feeder 5 includes three main components, including a tension dance arm assembly 9, an idler 11 and a threading gripper 13. To set up the system 3 for operation with a new spool 1 of optical fiber 7, the free end of the spool of fiber initially is thread through the feeder 5 and then held in place by the threading gripper 13. The threading gripper 13 holds the free end of the spool of optical fiber 7 not only when a new spool is added to the system, but also after a section of optical fiber is cut by the system in the manner described below. The threading gripper 13 also serves to pass the free end 7f of the fiber to a winder 17 as discussed further below.

The idler 11 serves as a guide for the optical fiber 7 so that the fiber is aligned with the threading gripper 13. The idler can be implemented in any of numerous ways. In accordance with one illustrative embodiment of the present invention, the idler 11 includes a base 11b and a pulley 11p that is rotatably mounted thereto to reduce the friction caused by the optical fiber 7 passing over the idler 11. Of course, the idler 11 can be implemented in numerous other ways, and is not limited to employing a pulley system.

In the embodiment shown in FIG. 1, the tension dance arm assembly 9 includes a base 9b, a pulley 9p and an arm 9a that mounts the pulley 9p to the base 9b. The tension dance arm assembly is the primary component within the feeder 5 that acts to maintain constant tension on the optical fiber 7 as it is fed through the system 3. The arm 9a is pivotally mounted to the base 9b so that the relative distance between the pulley 9p and the spool 1 can be altered by the tension dance arm assembly 9. In this respect, the tension dance arm assembly 9 is arranged so that the pulley 9p is urged under the effect of gravity to tend to drop down and thereby reduce the angle c between the arm 9a and the base 9b. The pulley 9p is prevented from dropping down by the optical fiber 7, which is attached at one end to the spool 1 and at the free end 7f to other components of the system 3 (e.g., the threading gripper 13 and/or a component of the winder 17 as discussed below). The tension dance arm assembly 9 can be arranged so that a desired angle c between the arm 9a and the base 9b (e.g., an angle of 90° indicating that the arm 9a is horizontal in FIG. 1) can be set to denote the optimal length of optical fiber 7 to be extending between the spool 1 and the idler 11. Thus, if the spool 1 is paying out the optical fiber 7 at a rate above the optimal payout rate, additional slack in the optical fiber 7 will result, thereby enabling the pulley 9p to drop down under the effect of gravity so that the arm 9a is below the optimum angle. The tension dance arm assembly 9 can include a sensor to detect the angle c of the arm 9a, and can then send a control signal to the spool 1 to control the rate at which the optical fiber 7 is being payed out. This can be done in any of numerous ways, including through a computer control system as discussed below. Thus, by monitoring the angle of the arm 9a, the tension dance arm assembly 9 can control the rate at which the optical fiber 7 is payed out from the spool 1, to maintain constant tension in the optical fiber 7. In accordance with one illustrative embodiment of the present invention, the spool control can be used to speed up or slow down rotation of the spool 1, and can be used to reverse the spool rotation to retract some of the optical fiber 7 back onto the spool 1.

It should be appreciated that the description provided above of the feeder 5 is provided merely for illustrative purposes, as numerous other techniques can alternatively be used for feeding the optical fiber 7 from the spool 1 to the remainder of the system 3.

As mentioned above, in the embodiment of the invention shown in FIG. 1, the threading gripper 13 is movably mounted to draw the free end 7f of the optical fiber 7 off of the spool 1, and to pass it to another component of the system. Specifically, in the embodiment of the invention shown in FIG. 1, the threading gripper 13 is mounted for sliding movement along an axis that is essentially in-line with the optical fiber 7 after it has passed over the idler 11, for moving in the direction of arrow A shown in FIG. 1. For example, after a new spool 1 has been manually fed through the system so that its free end 7f is grasped by the threading gripper 13 and operation of the system 3 commences, the threading gripper moves to the right in FIG. 1 in the direction of arrow A, and draws the free end of the optical fiber 7 with it. The threading gripper 13 then passes the free end 7f of the optical fiber to a winding gripper 15 of the winder 17, which performs a function that will be described further below. After the threading gripper 13 passes the free end 7f to the winder gripper 15, the threading gripper 13 releases the optical fiber 7 and moves back to its initial position shown in FIG. 1. After the winder 17 performs its winding function, the threading gripper 13 then regrips the optical fiber 7 in advance of a cutter 21, which cuts the optical fiber to create a section thereof that has been removed from the spool 1, with the result that the threading gripper 13 then grips a new free end of the optical fiber 7 that is still attached to the spool 1. It should be appreciated that the cutter 21 can be implemented in any of numerous ways and that the timing of the cutting operation can be varied. For example, the cutter 21 can cut the optical fiber 7 after the completion of the winding operation and before transfer of the coiled section of the optical fiber to a tray 23, or after transfer of the wound coil to the tray 23.

It should be appreciated that the above-described technique for passing the optical fiber 7 to the winder 17 is provided merely for illustrative purposes, as numerous other techniques are possible. For example, although the threading gripper 13 is movable in the embodiment of FIG. 1 to draw the optical fiber 7 to the winder 17, numerous other alternatives are possible, including employing a fixed threading gripper 13 and a winder 17 that moves to meet the threading gripper 13.

In the embodiment shown in FIG. 1, the winder 17 includes the winding gripper 15 and a mandrel 19 that is mounted for rotation about an axis B. In one embodiment of the present invention, the winding gripper 15 and the mandrel 19 maintain a fixed rotational orientation, such that each rotates simultaneously about the axis B. In one illustrative embodiment of the present invention, the threading gripper 13 moves across the mandrel 19 to pass off the free end 7f of the optical fiber to the winding gripper 15, such that the optical fiber 7 essentially rests against the mandrel 19 before the winding gripper 15 begins the winding operation. It should be appreciated that this is advantageous, as it assists in maintaining the optical fiber 7 in alignment with the feeder 5. Specifically, if the threading gripper 13 were to hand the free end 7f of the optical fiber to the winding gripper 15 on the other side of the mandrel 19, then when the winding operation began, the winding gripper 15 would draw the free end 7f(out of the page in FIG. 1) outwardly away from the mandrel 19 so that the optical fiber 7 would not maintain a constant alignment with the feeder 5. It should be appreciated that the winder 17 can rotate through any desired range of rotation (including one or more 360° rotations) to wind the optical fiber 7 about the mandrel 19. After this winding is complete, the cutter 21 cuts (either before or after transfer to the tray 23) the optical fiber, thereby creating a coiled section of optical fiber that is separated from the spool 1.

In accordance with one embodiment of the present invention, the winding gripper 15 is movably mounted to a base 17b of the winder 17, to enable the winding gripper to be moved in an up and down direction. For example, in accordance with one illustrative embodiment of the present invention, a fiber guide 14 is positioned between the idler 11 and the threading gripper 13 to assist in guiding the optical fiber 7 to the winder 17. The fiber guide 14 can take any of numerous forms, but in one embodiment of the present invention, it is a small circular guide that fixes the position of the optical fiber 7 passing therethrough to the relatively small surface area provided by the guide 14. The winder gripper 15 can initially be put in a position where it is in-line vertically with the fiber guide 14 when it grasps the free end 7f of the optical fiber. However, before the winding operation begins, the winding gripper 15 can be actuated to a vertical position either higher or lower than the position of the fiber guide 14. In accordance with one illustrative embodiment of the present invention, the winding gripper 15 is actuated to a vertical position higher than the optical guide 14, which causes a downward bias on the top surface of the optical fiber 7 that abuts against a lower surface of a component 29 provided on a stripper 27 that is described in more detail below. Thus, as the winder 17 winds the optical fiber 7 about the mandrel 19, the downward bias causes the optical fiber to form a helical coil. Furthermore, the relative position of the winding gripper 15 higher than the optical guide 14, and thus higher than the portion of the fiber 7 leading from the optical guide 14 to the mandrel 19, allows the winding gripper 15 to rotate freely around the mandrel 19 without coming into contact with the fiber 7. Although providing an actuated winding gripper is advantageous for these reasons, it should be appreciated that the present invention is not limited in this respect, and that a winding gripper 15 can be employed that does not move up and down relative to the base 17b of the winder.

In accordance with one illustrative embodiment of the present invention, the coil of optical fiber formed using the methods and apparatus disclosed herein is intended to have both of its ends available for additional processing, for example to undergo other automated steps for preparing an optical fiber as described in a related application entitled "Apparatus and Method for Automated Preparation of an Optical Fiber", filed on even date herewith (hereafter the "System Application"). Thus, unlike conventional processes where a cable or fiber is formed into a coil but only one end of the cable or fiber need be accessible, in accordance with one illustrative embodiment of the present invention, it is desired to form a coiled section of optical fiber wherein both ends are accessible. Thus, the embodiment of the invention shown in FIG. 1 includes a winder 17 that produces a coiled section of optical fiber with both ends accessible.

In the illustrative embodiment of FIG. 1, an aspect of the winder 17 that results in both ends of the coiled section of optical fiber 7 being accessible is that the winding gripper 15 is spaced from an outer surface 19s of the mandrel 19 about which the optical fiber 7 is wound. In this respect, many conventional winding systems wind a cable or fiber about a mandrel with one of the ends of the cable or fiber attached directly to the surface of the mandrel about which the cable or fiber is wound, thereby making that end of the cable or fiber inaccessible. In the illustrative embodiment shown in FIG. 1, the winding gripper 15 spaces the free end 7f of the optical fiber a distance d from the outer surface 19s of the mandrel. Thus, after the winder 17 has completed its winding of the optical fiber 7 about the mandrel 19, the free end 7f of the optical fiber will be accessible (i.e., it will not be trapped under other sections of the coil). In addition, after the winding operation is completed, the cutter 21 will cut the optical fiber 7 in the manner discussed above, which will result in another free end of the optical fiber being freely accessible on the opposite side of the mandrel. In accordance with one illustrative embodiment of the present invention, the position of the cutter 21 is selected to ensure that the two free ends of the coiled section of optical fiber will be of approximately equal length, which provides advantages when used in accordance with other automated equipment for processing the coil of optical fiber. It should be appreciated that there are numerous other ways of producing a coil of fiber with both ends accessible, such that this aspect of the present invention is not limited to the particular implementation shown in FIG. 1.

Although the embodiment described above in connection with FIG. 1 employs a threading gripper 13 and a separate winding gripper 15, it should be appreciated that the present invention is not limited in this respect, as a single gripper alternatively can be employed to perform both the threading and winding functions discussed above.

In the embodiment of the invention illustrated in FIG. 1, the coiled section of optical fiber formed by the winder 17 is automatically transferred to a transport medium in the form of a tray 23. An example of one tray suitable for use with the embodiment of the present invention shown in FIG. 1 is described in co-pending U.S. patent application entitled "Tray for a Coiled Optical Fiber", filed on even date herewith, and incorporated herein by reference (hereafter the "Work Tray Application"). However, it should be appreciated that the embodiment of the present invention directed to automatically forming a coiled section of optical fiber is not limited to use with any particular transport medium.

In the embodiment illustrated in FIG. 1, the system 3 is adapted for use in an assembly line system that includes a conveyor mechanism (not fully shown) for providing a tray 23 to the system 3 for receiving a coiled section of optical fiber, and that then moves the tray 23 away from the system 3 after a coiled section of optical fiber has been loaded onto the tray 23. An example of a suitable conveyor mechanism is described in the above-referenced Pigtail System Application. However, it should be appreciated that the present invention is not limited to using this or any other type of conveyor system. In addition, although the use of a conveyor system provides a number of advantages in allowing the system 3 to be included in a larger overall system that automates other steps in the handling of the fiber coil, it should be appreciated that the embodiments of the present invention disclosed herein are not limited to use with such an automated conveyor system, as the steps of providing the tray 23 to and removing the tray 23 from the system 3 can be performed manually in other embodiments of the present invention. In the embodiment shown in FIG. 1, the system 3 includes a tray lifting assembly 25 that lifts the tray 23 from the conveyor mechanism to interact with the inserter 31 to receive a fiber coil. Alternatively, the mandrel 19 and inserter 31 could be made movable relative to the tray 23 to facilitate transfer of the fiber coil to the tray 23.

In the embodiment of the present invention shown in FIG. 1, the winder 17 includes a stripper 27 that is constructed and arranged to automatically strip a wound coiled section of optical fiber from the mandrel 19. As used herein, the term strip is meant to refer to removal of the coiled section of optical fiber from the mandrel without completely unwinding the coiled section of optical fiber. In this respect, one of the advantages to coiling a section of optical fiber is to ensure that the section of optical fiber can be confined in a relatively small work space when contrasted to the section of optical fiber being completely unwound. Therefore, it is desirable to remove the coiled section of optical fiber from the mandrel 19 without completely unwinding it.

It should be appreciated that there are numerous techniques that can be employed for implementing the stripper to remove the coiled section. In the embodiment illustrated in FIG. 1, the stripper 27 includes a component 29 that is disposed adjacent the surface 19s of the mandrel about which the optical fiber is wound. The stripper 27 is mounted for movement relative to the mandrel 19, for example in a direction along the axis B about which the mandrel rotates. As the stripper 27 is moved downwardly in FIG. 1, the component 29 pushes down on the wound section of optical fiber to strip it from the mandrel 19. The component 29 can take any of numerous forms, as the present invention is not limited to any particular configuration. In one embodiment of the present invention, the component 29 is a cylindrical sleeve that matches a cylindrical shape of the mandrel 19. The component 29 need not extend all the way around the mandrel, as it can include spaced sections disposed at one, two or more locations about the mandrel to achieve the same function. However, in accordance with one illustrative embodiment of the present invention, the stripper is arranged to have a contour that matches the winding surface (e.g., the mandrel surface 19s) about the entire circumference of the winding surface. As used herein, the reference to the circumference of the surface is intended to relate to any curved surface, and is not intended to be limited to a circle. By using a stripper that has a contour that matches the entire circumference of the winding surface, it is possible to have the stripper apply an essentially equal stripping force to the coil about the entire circumference, which is advantageous in smoothly stripping the coil off of the winding surface, without damaging it. Although this provides the advantages discussed above, it should be appreciated that this is not a limitation of all embodiments of the present invention, as other configurations are possible.

While the stripper 27 is movably mounted to the mandrel 19 in accordance with one embodiment of the present invention, it should be appreciated that in an alternate embodiment of the invention, the stripper 27 can be stationary, and the mandrel 19 can be mounted for movement relative thereto, for example, to enable movement of the mandrel upward in FIG. 1.

The system 3 illustrated in FIG. 1 further includes an inserter 31 that handles the two ends of the coiled optical fiber created after the section of optical fiber has been wound about the mandrel 19. In the embodiment shown, the inserter 31 includes a pair of arms 31a and a pair of handlers 31h mounted thereto. The arms 31a space the handlers 31h from the surface of the mandrel 19s, and position the handlers 31h adjacent to the ends of the fiber coil. As opposed to the stripper component 29 that may simply be a flat surface to push the wound fiber off of the mandrel, the stripper 31 includes handlers 31h because the ends of the fiber can benefit from more support when removing the fiber coil from the mandrel and inserting it into the tray 23. In this respect, in accordance with one embodiment of the present invention, the tray 23 includes particular features that are adapted to restrain the free ends of the coiled optical fiber. Therefore, by employing handlers 31h to handle the ends upon insertion, the apparatus of the present invention shown in FIG. 1 can ensure that the ends of the fiber coil are precisely aligned with the appropriate features on the tray 23.

In the illustrative embodiment shown in the Figures, the surface 19s of the mandrel 19 about which the optical fiber is wound is a continuously curved surface (e.g., a cylinder). This is advantageous in that it minimizes the bending stresses on the optical fiber during the winding operation. However, it should be appreciated that this is not a limitation of all embodiments of the present invention, as other configurations are possible. For example, in accordance with one illustrative embodiment of the present invention, the winding surface is sized and shaped to insure that a minimum bending radius of the optical fiber is not violated during the formation of the fiber coil.

It should be appreciated that in the embodiment of the present invention described above, the acts of stripping the fiber coil from the mandrel 19 and inserting the fiber coil into the tray 23 are performed without gripping the optical fiber. In this respect, the component 29 of the stripper 27 simply pushes the coil off of the mandrel 19, without gripping the coil. Similarly, in accordance with one illustrative embodiment of the present invention, the handlers 31h of the inserter 31 also only exert downward force on the fiber but do not grip it. By performing the stripping and insertion functions without gripping the fiber, potential damage to the fiber from the gripping operation is avoided. Although this is advantageous, it should be appreciated that all embodiments of the present invention are not limited in this respect, and that it is possible to perform the stripping and/or inserting operations using gripping devices.

It should be appreciated that the structure of the inserter 31 shown in FIG. 1 is provided merely for illustrative purposes, as numerous other configurations are possible. For example, although the handlers 31h provide the advantages discussed above, it should be appreciated that they are not required in all embodiments of the present invention.

The sequence of operation of the components of the system 3 described above can be varied in numerous ways. For example, in accordance with one embodiment of the present invention, the handlers 31h are V-shaped fiber guides that position the ends of the fiber in features of tray 23, and cutter 21 cuts the optical fiber once the handlers 31h have asserted downward force on the optical fiber (so that tension will be maintained on the optical fiber) and inserted the fiber ends into the tray, but prior to the wound section of optical fiber being inserted into the tray 23. However, in an alternate embodiment of the present invention, the cutter 21 does not cut the optical fiber 7 until after the fiber coil has been stripped from the mandrel 19 and inserted into the tray 23, in which case the handlers need not assert force on the ends of the fiber to maintain tension thereon.

Figure 14:
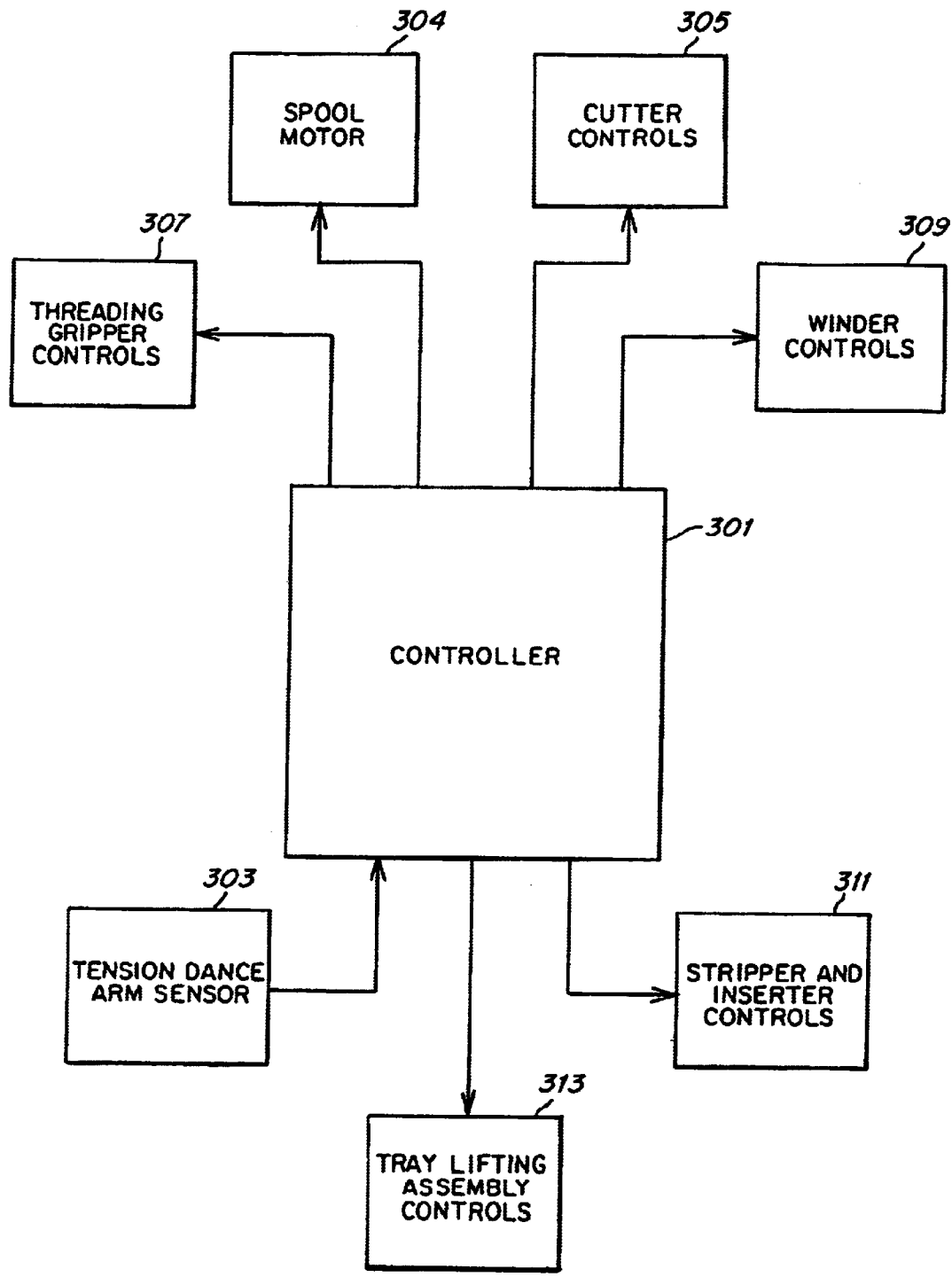
FIG. 14 is a block diagram of a control circuit for operating the system of FIGS. 2–3.

It should be appreciated that there are a number of moving parts in the system of FIG. 1. In accordance with one illustrative embodiment of the present invention, a control system (illustrated schematically in FIG. 14) is provided to coordinate control of each of these movable components of the system. In the illustrative embodiment shown in FIG. 14, a controller 301 receives an input from a sensor 303 associated with the tension dance arm assembly 9, and uses that information to control a spool motor 304 as discussed above. The controller 301 also controls actuation of cutter controls 305 that control actuation of the cutter 21 (FIG. 1), threading gripper controls 307 that control actuation of the grippers on the threading gripper 13, as well as movement of the threading gripper 13 to advance the optical fiber 7 toward the winder 17. In addition, the controller 301 controls actuation of winder controls 309 to control rotation of the winder 17 and actuation of the winder grippers 15, stripper controls 311 that control actuation of the stripper 27 and inserter 31, and tray lifting assembly controls 313. It should be appreciated that by controlling actuation of each of these components via a central controller 301, coordination of the system can be achieved, to ensure that each component performs the appropriate action at the appropriate time.

The controller 301 can be implemented in any of numerous ways, as the present invention is not limited to any particular technique. In accordance with one illustrative embodiment of the present invention, the controller 301 is a processor that is programmed (via software) to perform the above-recited control functions, and to coordinate interaction amongst the various system components. Of course, it should be appreciated that other implementations are possible, including the use of a hardware controller, and/or multiple controllers that replace the single central controller 301.

It should be appreciated that the system 3 schematically illustrated in FIG. 1 can be implemented in any of numerous ways, as the present invention is not limited to any particular implementation technique. A detailed explanation is provided below of an illustrative machine that implements the system 3 of FIG. 1. Of course, this implementation is provided merely for illustrative purposes, as numerous other implementations are possible.

Figure 2:
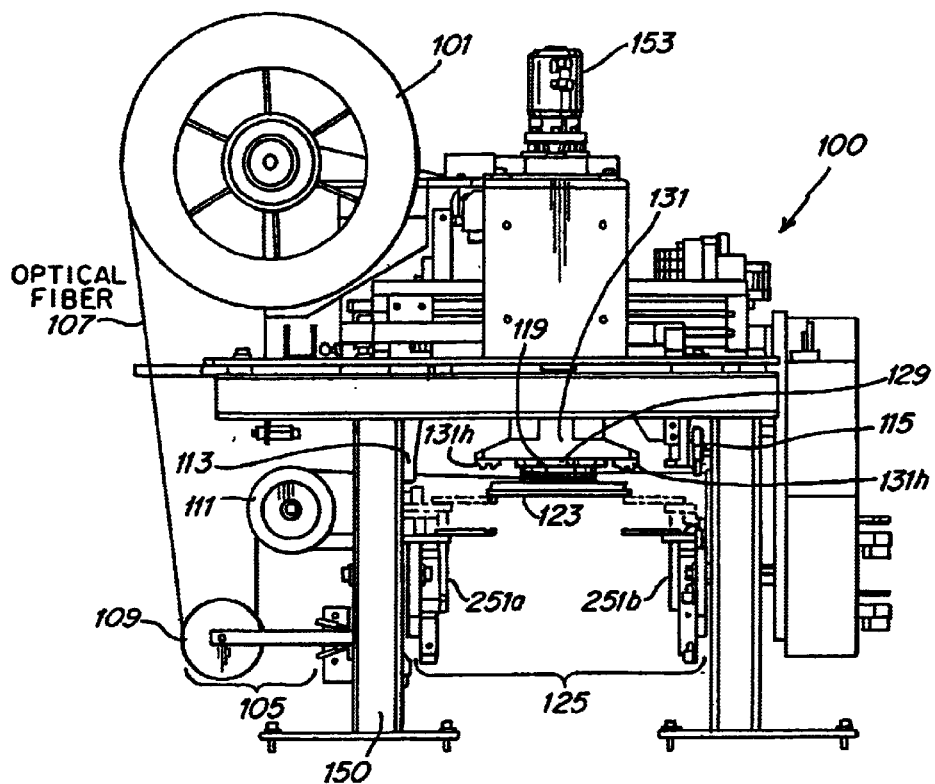
FIG. 2 is a side view of an illustrative machine for implementing the system of FIG. 1.
Figure 3:
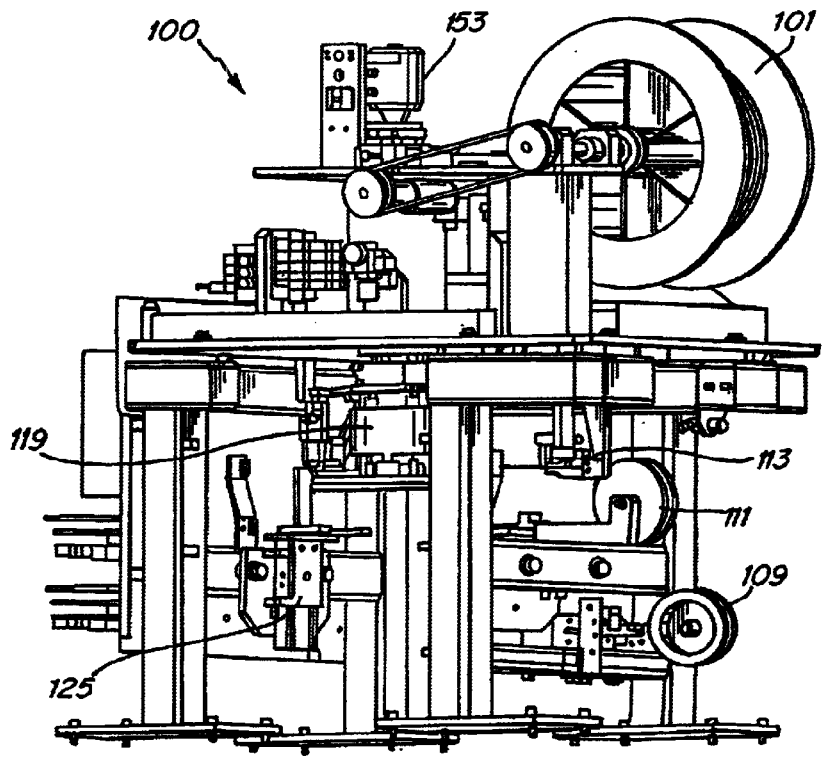
FIG. 3 is a perspective view of the machine of FIG. 2.

FIGS. 2–3 illustrate different views of a complete machine 100 for implementing the system 3 of FIG. 1, with FIG. 2 being a side view of the machine 100 having an optical fiber 107 threaded therethrough, and with FIG. 3 being a perspective view of the machine 100 without an optical fiber being threaded therethrough.

The machine 100 includes a spool 101 of optical fiber 107, as well as a feeder 105 to feed the optical fiber 107 to the other components of the machine 100. The feeder 105 includes a tension dance arm assembly 109 and an idler 111, which perform the functions discussed above in connection with the tension dance arm assembly 9 and idler 11 of FIG. 1. In this respect, while the more detailed components illustrated in FIGS. 2–3 perform essentially the same functions as discussed above with the schematic representation in FIG. 1, different reference numerals are used in the more detailed FIGS. 2–3, to denote that the components are not identical to the schematic representations shown in FIG. 1. Stated differently, it should be appreciated that the more detailed components illustrated in FIGS. 2–3 are merely examples of ways in which the schematic components discussed above in connection with FIG. 1 can be implemented.

The machine 100 includes a threading gripper 113 (see FIGS. 2–3) that performs the function of the threading gripper 13 of FIG. 3, as well as a winder 117 that includes a mandrel 119 and winding gripper 115 that perform the functions of the components of the winder 17 discussed in connection with FIG. 1. In addition, the machine 100 includes a stripper that includes a cylindrical sleeve 129 and an inserter 131 that includes handlers 131h that perform the functions of the stripper and inserter components discussed above in connection with the schematic illustration of FIG. 1. Furthermore, the machine includes a tray lifting apparatus 125 to present a tray 123 to the inserter 131 to receive a coiled section of optical fiber 107, in much the same manner as the schematic components discussed above in connection with FIG. 1. The machine 100 includes a base or frame 150 that supports each of the other components.

Figure 4:
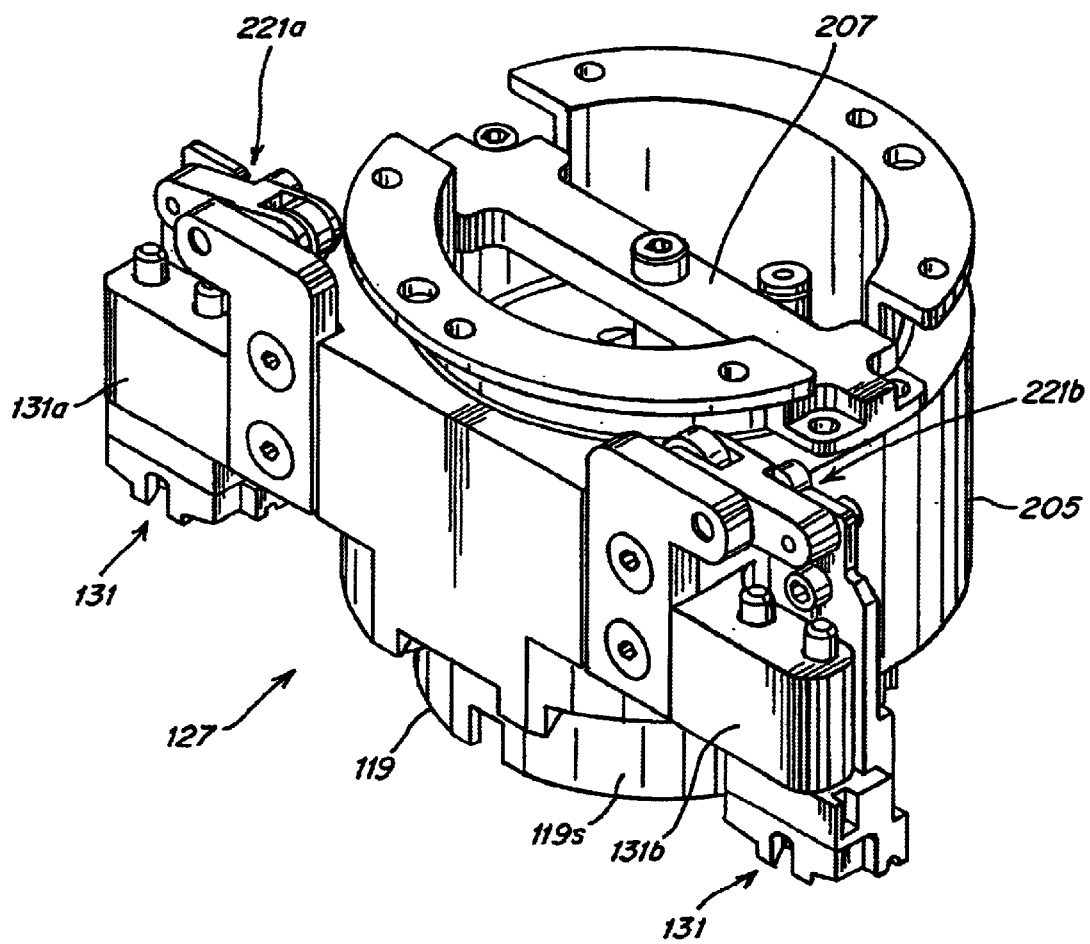
FIG. 4 is a perspective view of certain components that form the winder of the machine of FIGS. 2–3.

A more detailed exploded perspective view of the mandrel 119 is provided in FIG. 4. In the embodiment shown, the mandrel 119 has a cylindrical shape. However, it should be appreciated that the present invention is not limited in this respect, and that the mandrel 119 can take any suitable shape that enables the optical fiber to be wound about it. In the embodiment shown, the optical fiber is wound, by the winding gripper 115, about the mandrel 119 in a helical coiled pattern. The machine 100 can be adapted for use with fibers of various diameters. For example, the machine 100 can be used to process optical fibers having diameters between 180 μm and 900 μm, although the machine 100 can obviously be adapted to work with fibers of other sizes. In accordance with one embodiment of the present invention, the mandrel 119 has a diameter of approximately 75 millimeters, and the winding gripper 115 is spaced from the mandrel 119 so that each 360° rotation of the mandrel 119 winds approximately one-quarter meter of optical fiber about the outer surface 119s of the mandrel. With a single rotation of the mandrel 119, a 0.75 meter segment of coiled optical fiber can be formed with each successive 360° rotation of the mandrel 119 adding 0.25 meters to the optical fiber coil. It should be appreciated that the diameter of the mandrel 119 can be selected to any desired diameter, and will impact the diameter of the fiber coil formed by the machine 100. In addition, the diameter of the mandrel will, along with the number of rotations of the mandrel used in forming a coil, impact the length of fiber included in a fiber coil formed by the machine 100. In one embodiment of the present invention, the mandrel diameter is also selected to prevent a coiled fiber from reaching a minimum bend radius when it is wound about the mandrel, which would cause damage to the optical fiber. For many optical fibers used in the applications discussed above, the minimum bend radius is 35 millimeters.

Figure 5:
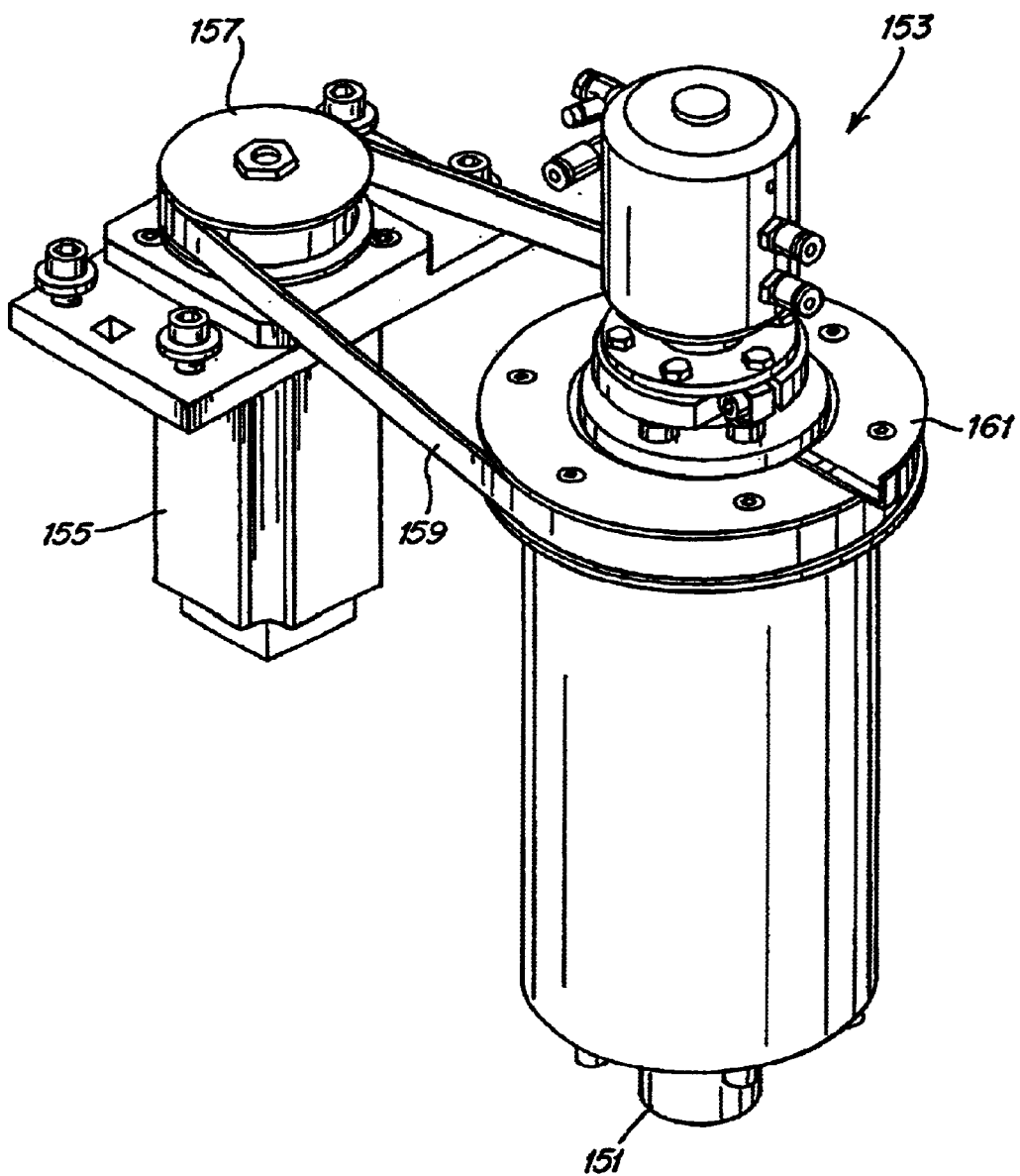
FIG. 5 is a perspective view of additional components relating to the winder of the machine of FIGS. 2–3.

It should be appreciated that the mandrel 119 can be rotated in any of numerous ways. In the illustrative embodiment shown in the figures, the mandrel 119 is driven by a mandrel winding shaft 151 (see FIGS. 5–6). The mandrel winding shaft 151 is in turn driven by a spindle assembly 153 (see FIGS. 2–3 and 5). The spindle assembly 153 includes a servo motor 155 that drives a drive pulley 157, which is coupled, via a timing belt 159, to a shaft pulley 161, which is in turn coupled to the mandrel winding shaft 151 to cause rotation thereof. Again, the spindle assembly 153 illustrated in FIG. 5 is merely one example of a technique for driving rotation of the mandrel 119, as numerous other techniques are possible, such that the present invention is not limited to the spindle assembly 153 illustrated in FIG. 5, or any other type of drive mechanism.

Figure 6:
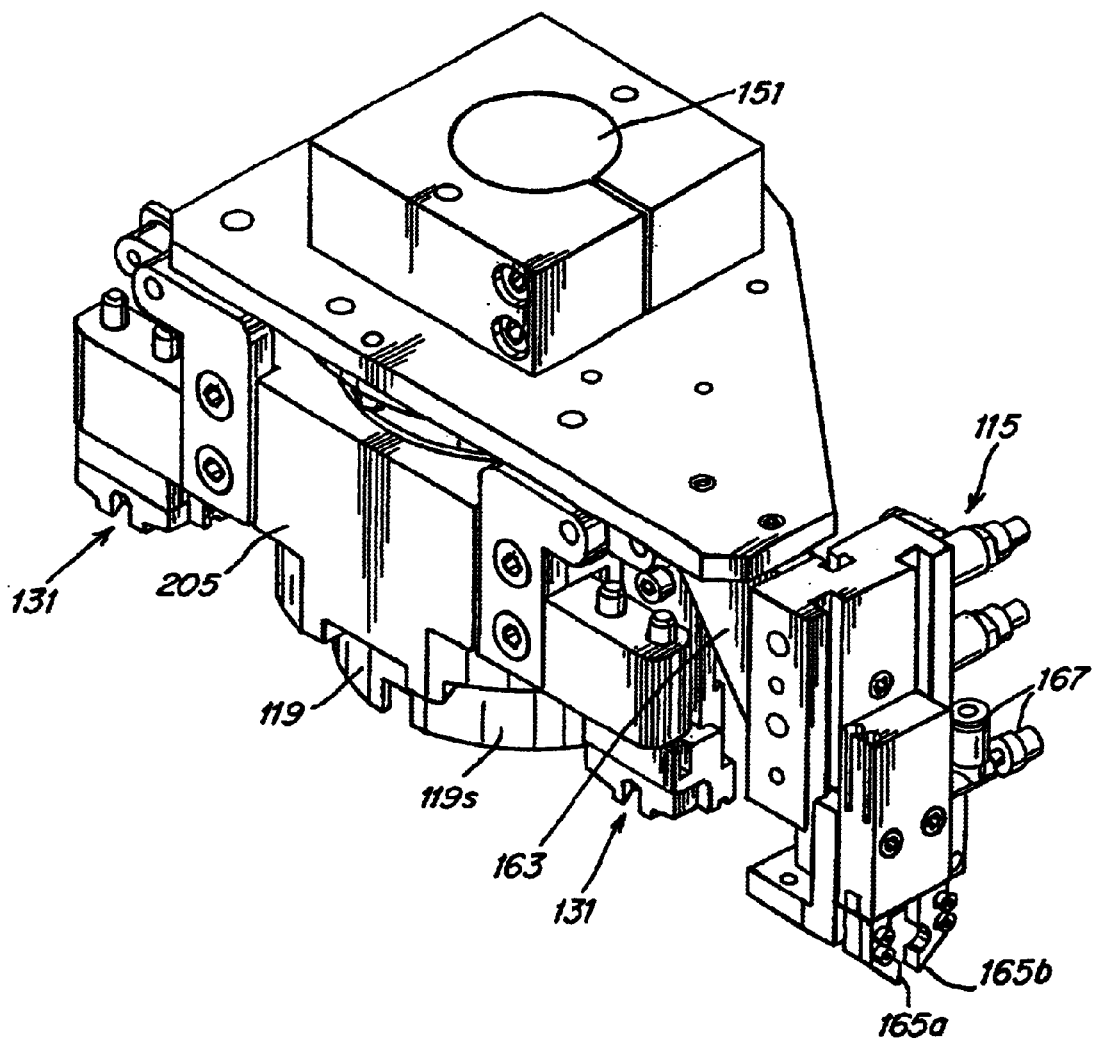
FIG. 6 is a perspective view of certain components of the stripper of the machine of FIGS. 2–3.
Figure 7:
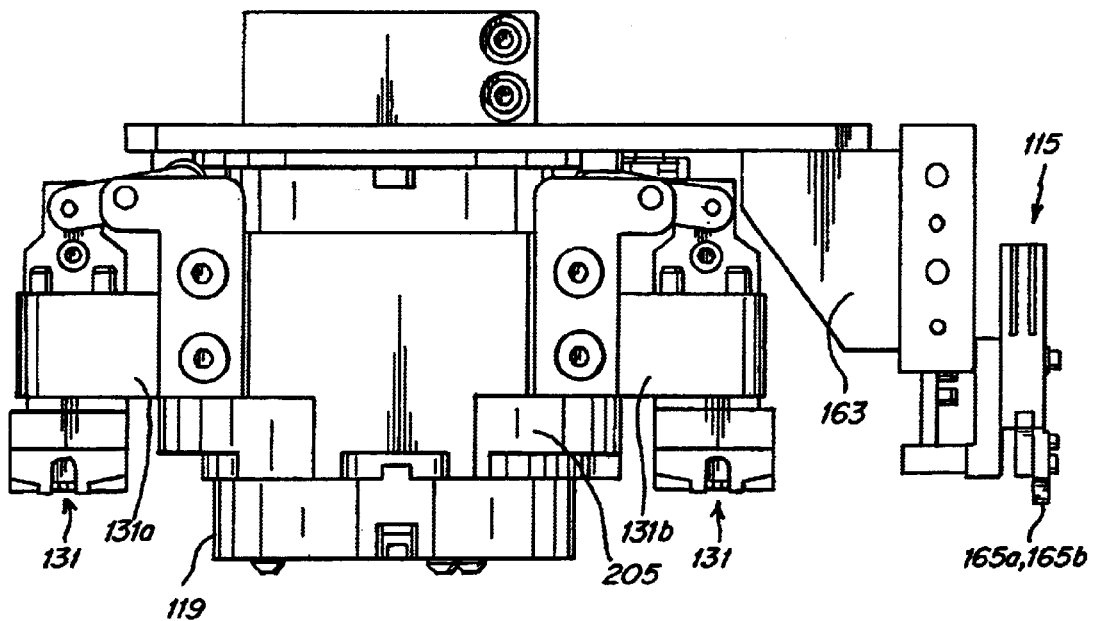
FIG. 7 is a side view of the winder and stripper of the machine of FIGS. 2–3.

A more detailed view of one illustrative technique for implementing the winding gripper 115 (see FIGS. 2–3) is provided in FIGS. 6–7. The winding gripper 115 is mounted to the mandrel 119, via a mounting brace plate 163, in such a way that rotation of the mandrel 119 about its rotational axis causes corresponding and equal rotation of the winding gripper 115 about the mandrel axis. In the embodiment illustrated in FIG. 6, the winding gripper 115 includes a pair of gripping fingers 165a, 165b that are adapted to pinch the optical fiber 107 and hold it in place. The pinching force for the gripping fingers 165a, 165b can be applied, for example, by a controllable pneumatic pressure unit 167 or any other technique suitable for exerting sufficient pressure to cause the gripping fingers to hold the fiber in place without damaging it. It should be appreciated that the winding gripper 115 alternatively can be implemented using arrangements other than a dual gripping finger configuration. For example, the optical fiber 107 can be held in place by a gripping assembly having a cylindrical opening into which the fiber is placed, with a centripetal force applied to the fiber holding it in place during winding, or using any other suitable configuration.

In the embodiment shown in the figures, it is the mandrel 119 that is rotatable relative to the frame 150 (FIG. 2), with the winding gripper 115 being mounted for rotation in a fixed orientation relative to the mandrel. However, it should be appreciated that other techniques are possible, including using a fixed mandrel 119 and a winding gripper 115 that is rotatably mounted relative to the fixed mandrel 119.

Figure 8:
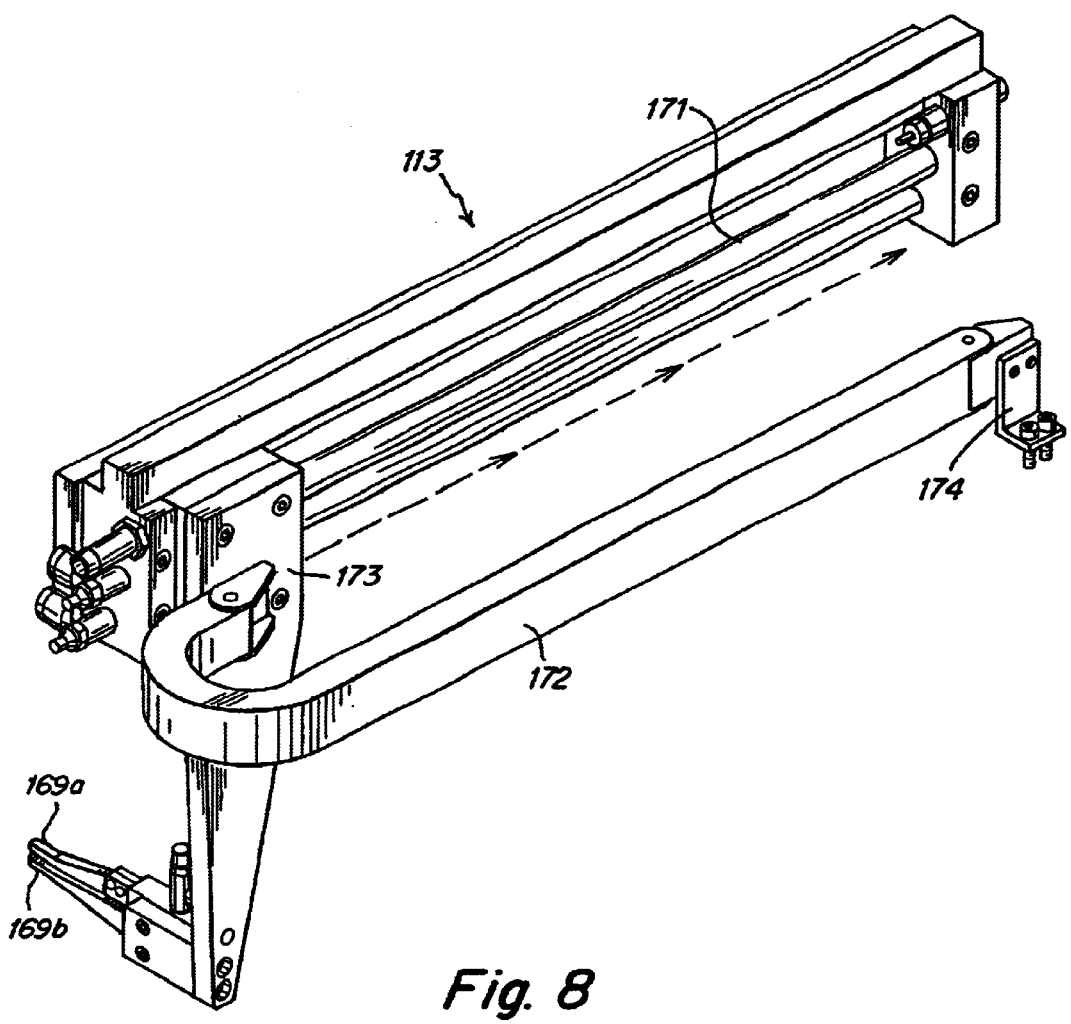
FIG. 8 is a perspective view of components of the threading gripper in the machine of FIGS. 2–3.

An illustrative implementation of the threading gripper 113 is shown in FIG. 8. The threading gripper 113 includes a pair of gripping fingers 169a, 169b that work in much the same manner as the gripping fingers 165a, 165b described above in connection with the winding gripper 115. As discussed above, when a new spool 101 of optical fiber 107 is installed onto the machine 100, the optical fiber 107 can be manually fed through the gripping fingers 169a, 169b. The threading gripper 113 further includes a track 171 that receives a sliding mount 173 to which the gripping fingers 169a, 169b are mounted. The track 171 is supported by the frame 150 so that the gripping fingers 169a, 169b are movable from a position adjacent the idler 111 to a position accessible to the winding gripper 115. As should be appreciated from the discussion of the schematic illustration in FIG. 1, the gripping fingers 169a, 169b initially grip a free end of the optical fiber 107, then slide over the track 171 to a position adjacent the winding gripper 115, enabling the winding gripper 115 to grasp the free end of the optical fiber 107. At that point, the gripping fingers 169a, 169b release their grip on the optical fiber and the sliding mount 173 returns, via the track 171, to its original position, with the fiber continuing to pass between the gripping fingers 169a, 169b. After the winding operation is complete, the gripping fingers 169a, 169b again grasp the optical fiber 107 in preparation for the cutter 121 cutting the optical fiber in the manner discussed above.

Actuation of the gripping fingers 169a, 169b and movement of the sliding mount 173 across the track 171 can be controlled in any of numerous ways, as the present invention is not limited to any particular control technique. In accordance with one embodiment of the present invention, these components are pneumatically controlled, in much the same manner as the gripping fingers 165a, 165b of the winding gripper 115 described above. Movement of these and the other movable components of the machine 100 can be controlled and coordinated by a centralized controller as described below, or in any other suitable manner. In the embodiment shown in FIG. 8, the threading gripper 113 includes a flexible sleeve 172 that is coupled between the sliding mount 173 and a fixed mount 174 that can be mounted to the frame 150 (FIG. 2). The flexible sleeve can be used to house control wires or cables to couple the sliding mount 173 and the gripping fingers 169a, 169b to a controller.

It should be appreciated that the threading gripper 113 need not employ a pair of gripping fingers 169a, 169b, nor a linear tracking mechanism as described above, as numerous other configurations are possible. For example, any movement of the gripping fingers 169a, 169b from a position adjacent the idler 111 to a position adjacent the winding gripper 115 can be employed, as linear movement is not required. In addition, these components need not be controlled pneumatically, as other types of control can be employed, including hydraulic, electrical or other actuation control techniques. Furthermore, it should be appreciated that the machine 100 need not include a threading gripper 113 that is distinct from the winding gripper 115, as both gripping functions can alternatively be formed by a single gripping component.

Figure 9:
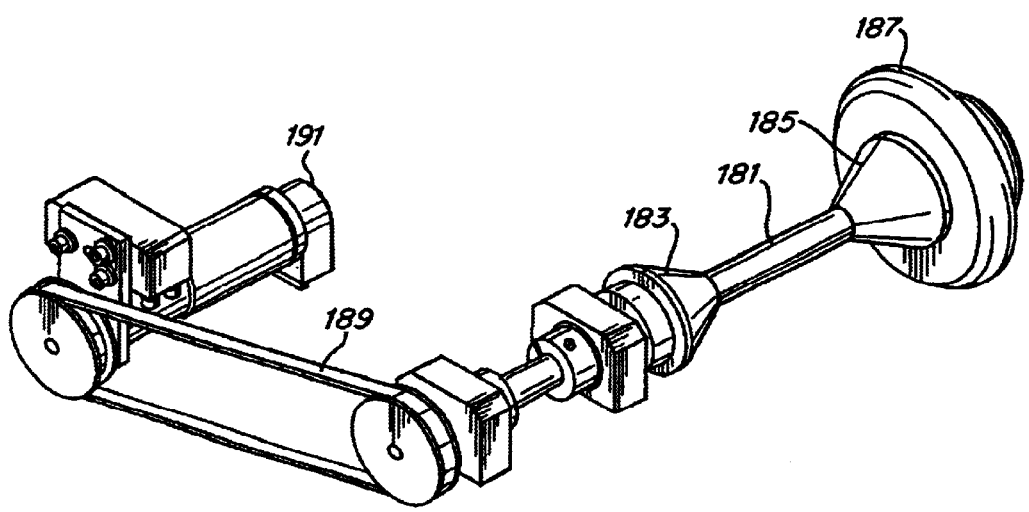
FIG. 9 is a perspective view of components of a payout spool assembly for the machine of FIGS. 2–3.
Figure 10:
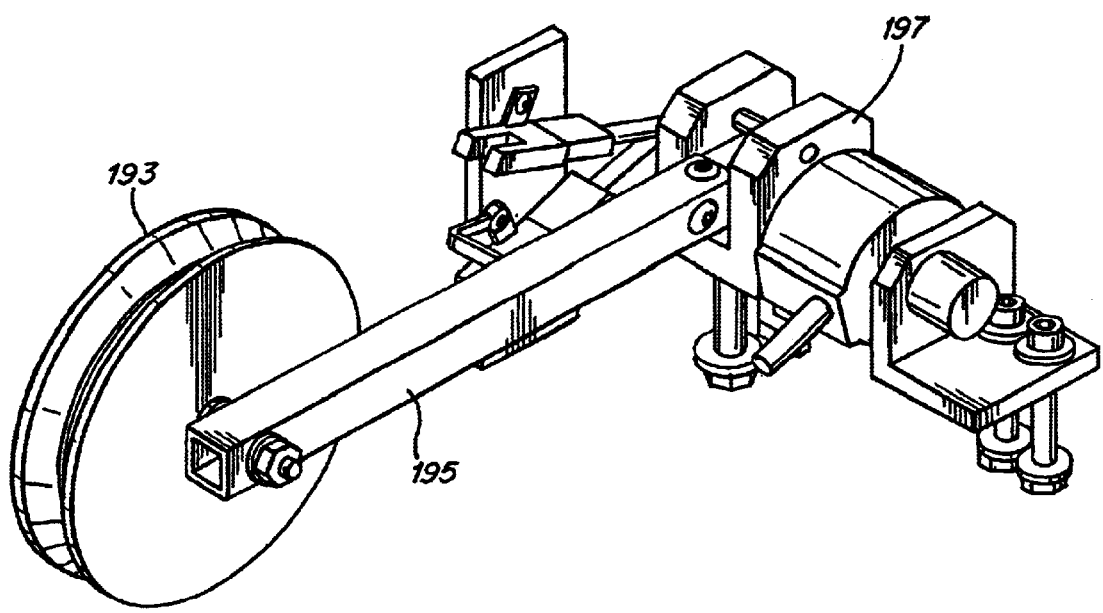
FIG. 10 is a perspective view of the dancer arm assembly of the machine of FIGS. 2–3.
Figure 11:
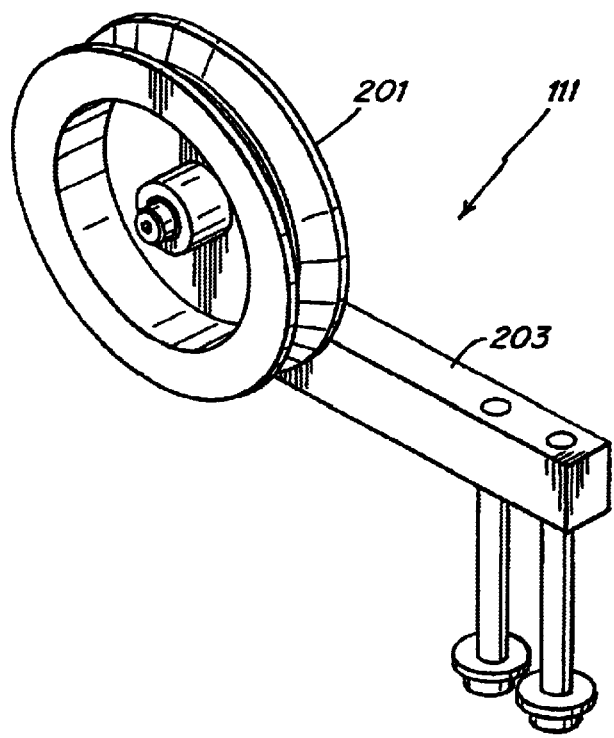
FIG. 11 is a perspective view of the idler of the machine of FIGS. 2–3.

An illustrative implementation of the feeder 105 is shown in FIGS. 9–11. The feeder 105 includes a spool shaft 181 to support a spool 101 including the optical fiber 107. Conical bushings 183, 185 are mounted on the spool shaft 181 and are adapted to securely seat and hold the fiber spool 101 on the shaft. These components can be dimensioned to accommodate spools 101 of any size. For example, in one embodiment of the present invention, the spool shaft 181 and the bushings 183, 185 are adapted to accommodate spools 101 with an outside diameter of up to twelve inches, a width of up to five inches, a core diameter of up to two inches, and spool weight of five pounds. Of course, it should be appreciated that the present invention is not limited in this respect, and that the machine components can be adapted to accommodate spools 101 of different sizes and dimensions.

Once the spool 101 is empty, it can be removed from the shaft 181 by removing the exterior conical bushing 185 along with an associated spool tightening dial 187, and then slidably removing the spool 101 from the shaft 181. The spool shaft 181 is connected to a stock driver and belt assembly 189 to rotate the spool shaft 181, and thereby dispense the optical fiber 107 to the other components of the machine 100. A motor 191 is used to actuate the stock drive and belt assembly 189 and control the rate of dispensing the optical fiber 107. The motor 191 is responsive to controls received from the tension dance arm assembly 109 to control the rate at which the optical fiber 107 is dispensed, in the manner discussed above.

It should be appreciated that the present invention is not limited to the particular spool mounting and drive mechanism shown in FIG. 9, as numerous other implementations are possible.

An illustrative implementation of the tension dance arm assembly 109 is shown in FIG. 10. The tension dance arm assembly and idler can be adapted, along with the spool mounting and drive mechanism of FIG. 9, to maintain a predefined tension in the optical fiber. In accordance with one embodiment of the present invention, the tension in the optical fiber is maintained below grams, although the machine can be adapted to maintain the fiber 107 at a different tension.

In the embodiment of the invention shown in FIG. 10, the tension dance arm assembly 109 includes a dancer pulley 193 that is rotatably mounted to a dancer arm 195, which is in turn pivotally mounted to a mounting block 197 that is mounted to the frame 150 (FIG. 2). The dancer arm 195 can be mounted to the frame 150 at any suitable location. As discussed above in connection with FIG. 1, the gravitational pull on the dancer pulley 193 and dancer arm 195 creates tension in the fiber 107 between the spool 101 and the threading gripper 113 and the winder 117. An encoder (not shown) or other sensor located at the point where the dancer arm 195 is pivotally mounted to the block 197 senses the angle of elevation of the dancer arm 195. Based on this sensor information, a controller sends control signals to the spool payout motor 191 (FIG. 9) to control the rate of dispensing the optical fiber 107. As discussed above in connection with FIG. 1, the rotation of the spool can be increased, decreased, stopped or even reversed, with the goal of the control system being to provide feedback to the feeder 105 to maintain a constant elevation of the dancer arm 195, which results in maintenance of a constant tension in the optical fiber 107.

An illustrative implementation of the idler 111 is shown in FIG. 11. The idler 111 includes an idler pulley 201 that is rotatably mounted to a pulley mount 203. The pulley mount 203 is mounted to the frame 150 (FIG. 2), and can be positioned in any suitable position between the dancer pulley 193 and the threading gripper 113. In accordance with one illustrative embodiment of the present invention, the idler 111 is positioned so that a top surface of the pulley 201 is aligned with the threading gripper 113, so that the optical fiber 107 forms an essentially straight horizontal line when extending between the idler 111 and the winder 117, although numerous other configurations are possible.

An illustrative implementation of the stripper 127 is shown in FIG. 4. As discussed above in connection with FIG. 1, one component of the stripper 127 is adapted to fit closely to an outer surface 119s of the mandrel 119. In the embodiment of FIG. 4, this component is a cylindrical sleeve 205 having an inner diameter that is only slightly larger than the outer diameter of the cylindrical mandrel 119, such that the tolerance between the sleeve 205 and the mandrel 119 is less than one half the diameter of the optical fiber 107. This close tolerance ensures successful stripping of the optical fiber 107. Of course, as discussed above, numerous other configurations are possible. The cylindrical sleeve 205 is arranged so that when the optical fiber 107 is being wound about the mandrel 119 by the winder 117, the sleeve 205 is disposed above the surface 119s of the mandrel 119 that receives the optical fiber. Within the interior of the cylindrical sleeve 205 is an air cylinder (not shown) that is fastened to a mount 207. When the air cylinder is actuated (i.e., under computer control), the mount 207 and the cylindrical sleeve 205 move downwardly (i.e., in the direction of the arrows shown schematically in FIG. 1) with the cylindrical sleeve 205 sliding over and in close tolerance with the mandrel 119 to push the fiber coil off of the lower end of the mandrel 119 and into the work tray 123. The air cylinder then causes the cylindrical sleeve 205 to retract over the mandrel surface 119s and return to its original position.

As mentioned above, it should be appreciated that numerous alternative configurations to perform the stripping function are possible, such that the present invention is not limited to the particular configuration shown in FIG. 4. An example of an alternative arrangement includes using mechanical stripping arms that pull the coiled fiber from the mandrel 119, as opposed to the cylindrical sleeve 205 that pushes it from above.

Figure 7A:
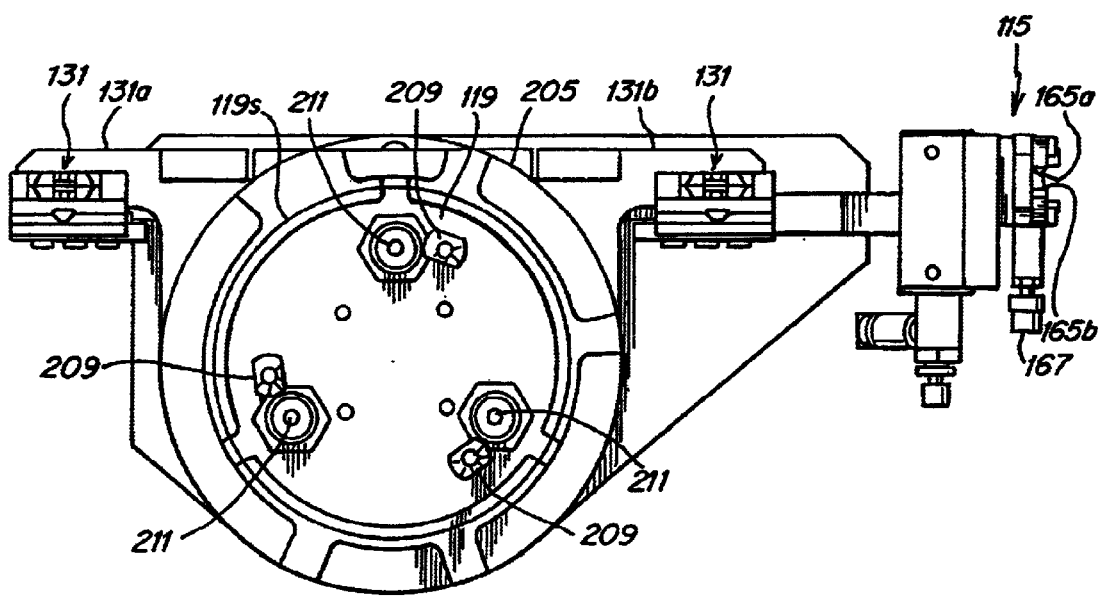
FIG. 7a is a bottom view of the mandrel used in the winder of the machine of FIGS. 2–3.

An illustrative implementation of the inserter 131 is shown in FIGS. 4, 7 and 7a. As shown in FIG. 7a, the mandrel 119 has a plurality of tray locator pins 209 fixed in position on its bottom surface. The tray locator pins 209 are adapted to mate with receiving features on the work tray 123 to mechanically align the work tray and allow the fiber coil being stripped from the mandrel 119 to be transferred to a precise position in the work tray 123, and are specifically adapted to work with a work tray 123 as described in the Work Tray Application and explained below. In the embodiment shown, the mandrel 119 also includes extendable tray actuator pins 211 that open the corresponding features on the work tray 123 to enable the fiber coil to be inserted into and secured on the work tray 123. The tray actuator pins can be actuated in any of numerous ways. For example, the tray actuator pins 211 can be pneumatically activated to extend from their initial position in the mandrel 119 to interact with the corresponding features in the work tray 123, or can be actuated in any other suitable way. After the fiber coil is inserted into the work tray 123, the tray actuator pins 211 can retract into the mandrel 119 to their initial position. The configuration, number and locations of the locator pins 209 and tray actuator pins 211 can obviously be varied from the illustrative embodiment shown in FIG. 7a, as the present invention is not limited to the particular configuration shown. Furthermore, it should be appreciated that numerous other features and techniques can be employed for aligning the work tray 123 with the winding surface on the mandrel 119 to facilitate inserting the fiber coil into a precise location in the work tray 123, as this aspect of the present invention is not limited to any particular implementation technique.

As discussed above in connection with FIG. 1, the inserter 131 handles the free ends of the fiber coil and inserts the free ends into precise locations in the work tray 123, so that when the work tray is used with other automated tools, the free ends of the fiber coil can be precisely located by the other tools. It should be appreciated that although the use of a pair of inserter components to separately handle the two free ends is advantageous, all embodiments of the present invention are not limited thereto. For example, a single inserter component can be adapted to interact with both ends of the fiber coil, only a single inserter component can be used if it is only desirable to precisely position one end of the fiber coil, or no inserter components need be used if it is not necessary to precisely locate either end of the fiber coil.

In the illustrative embodiment shown in FIG. 4, the inserter 131 is implemented by arm assemblies 131a, 131b that are pivotally mounted to the cylindrical sleeve 205 via cam assemblies 221a and 221b, respectively. As the cylindrical sleeve 205 is lowered over the mandrel 119 to strip the fiber coil therefrom, the arm assemblies 131a, 131b also are lowered and engage the ends of the fiber coil. In the embodiment shown, the arm assemblies 131a, 131b include fiber capturing features that are V-shaped to guide the fiber for insertion into the work tray 123. The downward force of the inserter arm assemblies 131a, 131b applied to the ends of the fiber coil is created by a gravity-induced pivoting of the cam assemblies 221a, 221b, as the arm assemblies move in a downward direction with the cylindrical sleeve 205.

Additional downward force is generated via compression springs (not shown) located within the inserter arm assemblies 131a, 131b. The spring loaded arm assemblies also act to limit the maximum insertion force applied against the fiber going into the work tray 123, to ensure that the optical fiber is not damaged. It should be appreciated that the force applied by the compression spring can alternatively be provided by numerous other mechanisms, examples of which include a solenoid, an air cylinder and an elastomeric member.

Again, it should be appreciated that the inserter 131 alternatively can be implemented in numerous other ways, as the present invention is not limited to the particular implementation shown.

Figure 12:
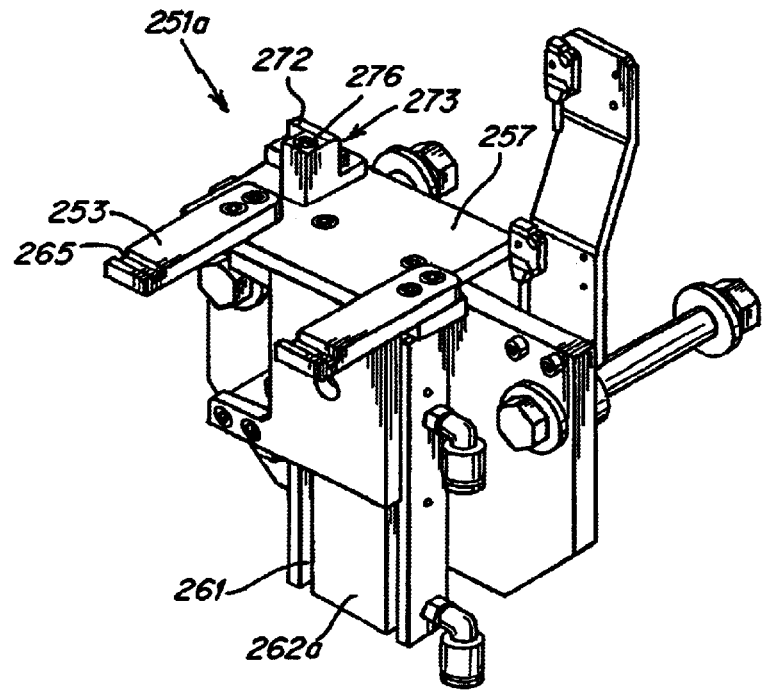
FIG. 12 is a perspective view of the near tray lifting sub-assembly of the machine of FIGS. 2–3.
Figure 12A:
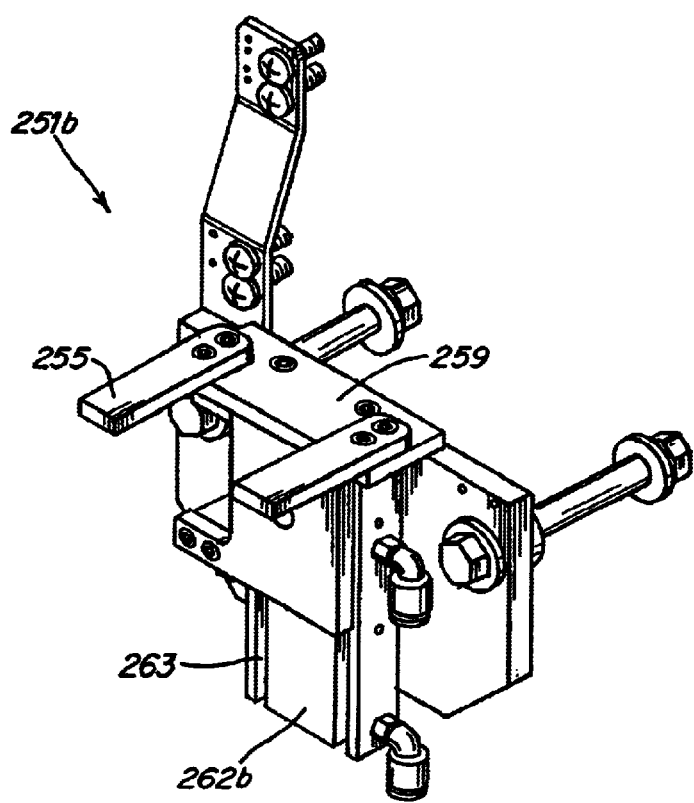
FIG. 12a is a perspective view of the far tray lifting sub-assembly of the machine of FIGS. 2–3.

An illustrative embodiment of the tray lifting assembly 125 is shown in FIGS. 2, 12 and 12a. The tray lifting assembly 125 includes a near subassembly 251a (FIG. 12) and a far subassembly 251b (FIG. 12a). An illustrative implementation of the near subassembly 251a is shown in FIG. 12, and an illustrative implementation of the far subassembly 251b is shown in FIG. 12a. The tray lifting assembly 125 is adapted to move the work tray 123, which is positioned between the two subassemblies 251a, 251b, into proximity with the vertically stationary mandrel 119 to assist in the process of inserting a fiber coil (stripped from the mandrel 119) into the work tray 123. The tray lifting assembly 125 includes lifting arms 253 (FIG. 12) and 255 (FIG. 12a) that support opposite sides of the tray 123 and are fastened to slidable tray lifting mount plates 257 (FIG. 12) and 259 (FIG. 12a) respectively. The near subassembly lifting arms 253 include grooves 265 cut transversely across the lifting arms to engage with tray features to hold the tray 123 in place for the fiber insertion process. The mount plates 257, 259 are adapted to move up and down on supports 262a, 262b, which are mounted to the frame 150 (FIG. 2) and have corresponding grooves 261 (FIG. 12) and 263 (FIG. 12a) to receive the mount plates 257, 259. The tray lifting assembly 125 can be actuated in any of numerous ways. In one embodiment of the present invention, the tray lifting assembly 125 is pneumatically actuated (although other techniques are possible), and moves the work tray 123 approximately two inches in the vertical direction (i.e., by having the mount plates 257, 259 move up along the supports 262a, 262b) to place the work tray 123 into close proximity with the mandrel 119. After a fiber coil is inserted into the work tray 123, the mount plates 257, 259 are lowered to their original positions so that the tray can be moved to other locations for subsequent processing, for example using the conveyor techniques described in the above-referenced Pigtail System Application or any other suitable technique.

Figure 13:
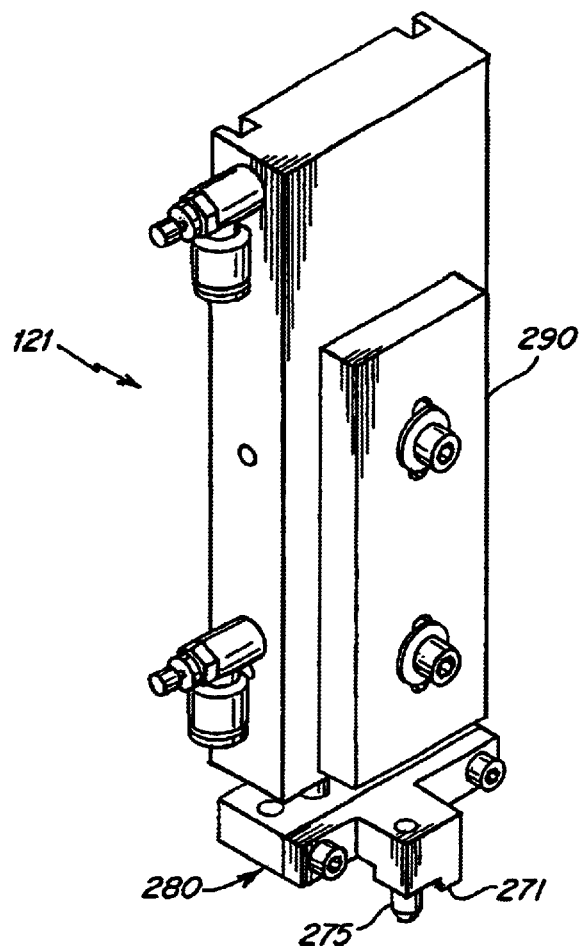
FIG. 13 is a perspective view of the cutter of the machine of FIGS. 2–3.
Figure 13A:
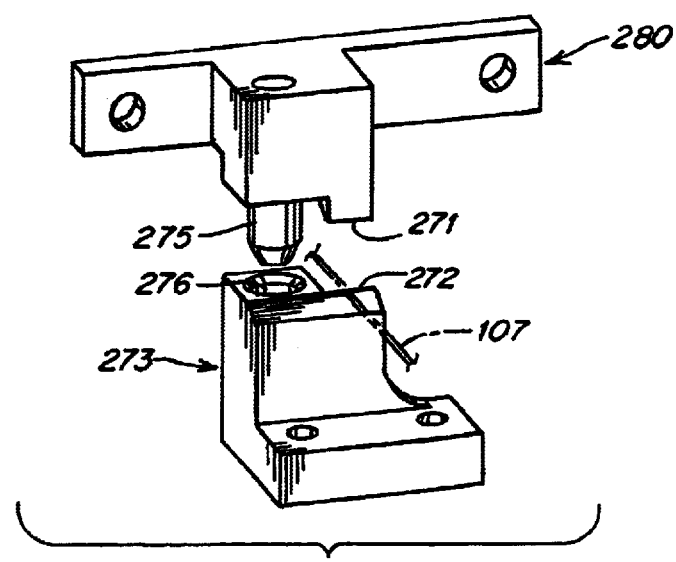
FIG. 13a is an enlarged perspective view of certain components of the cutter of the machine of FIGS. 2–3.

An illustrative embodiment of the cutter 121 is shown in FIG. 13, with an enlarged view of certain components of the cutter 121 shown in FIG. 13a. As discussed above, the cutter 121 is adapted to cut a section of the optical fiber 107 extending between the threading gripper 113 and the winder 117 and/or the work tray 123. The cutter 121 comprises two main components: a stationary cutter mounting plate 290 and a movable upper cutting blade support 280. The upper cutting blade support 280, in turn, comprises an upper cutting blade 271, which will be described in further detail below. The cutter 121 is adapted to be mounted via the cutter mounting plate 290, relative to the frame 150 (FIG. 2), in the appropriate position. In accordance with one illustrative embodiment of the present invention, the cutter 121 comprises an internal dual rod pneumatic cylinder (not shown) to guide the movement of the upper cutting blade support 280 relative to the cutter mounting plate 290, in the up and down direction as illustrated conceptually in FIG. 1. However, it should be appreciated that the movement of the upper cutting blade support 280 can be guided in numerous other ways. The control of actuation of the cutter 121 can be accomplished pneumatically, or in any other suitable way.

As previously described, the movable upper cutting blade support 280 comprises an upper cutting blade 271. When the cutter 121 is actuated, the upper cutting blade 271 moves vertically down to a cutting position in close proximity to a stationary lower cutting blade 272 located on a cutting block 273 (FIGS. 12 and 13a) within the near subassembly 251a of the tray lifting assembly 125. The convergence of the upper cutting blade 271 with the lower cutting blade 272 shears the optical fiber 107 (shown in relief in FIG. 13a) between the two blades. The upper cutting blade support 280 then moves back to the non-cutting position, leaving the cut end of the fiber coil as a free end. As discussed above, the cutting action can take place either before or after insertion of the fiber coil into the work tray 123. In the embodiment shown in the Figures, the cutting operation takes place after insertion of the fiber coil into the work tray.

In accordance with the illustrative embodiment shown that has a pair of cutting blades 271, 272 to shear the optical fiber 107, an aligning system can be employed to ensure that the converging cutting blades maintain the proper alignment to shear the optical fiber. The aligning system can be implemented in any of numerous ways, as this embodiment of the present invention is not limited to any particular aligning technique. In the embodiment shown, an aligning pin 275 is located on the upper cutting blade support 280, and is adapted to mate with an aligning pin receptacle 276 located within the cutting block 273. Thus, as the upper cutting blade support 280 moves towards the cutting block 273, the aligning pin 275 and the aligning pin receptacle 276 mate to guide the cutting blades 271, 272 to their proper cutting positions. Another example of a technique for aligning the cutting blades includes the use of an electronic sensor that can detect the relative positions of the cutting blades and induce relative movement to ensure proper alignment.

It should be appreciated that although the use of an aligning system provides the advantages discussed above, it is not a necessity, and can be eliminated in other embodiments of the present invention. Furthermore, it should be appreciated that the specific implementation of the cutter 121 described above is provided merely for illustrative purposes, and that numerous other implementations are possible. For example, rather than employing a pair of cutting blades that shear the optical fiber, an alternative arrangement could include a single cutting blade that cuts the optical fiber on a cutting block surface. In accordance with that embodiment of the present invention, the alignment system can be eliminated.

In accordance with one illustrative embodiment of the present invention, the following timing sequence is followed. As a preliminary step, a length of fiber sufficient to reach from the spool 1, through the tension dance arm assembly 9 and idler 11, to the threading gripper 13, is manually fed out from the spool 1. The end of the fiber is held in the threading gripper 13 in such a way that a length of the fiber (e.g., less than one inch), protrudes from the threading gripper 13. Once the threading gripper 13 is actuated to secure the free end of the fiber, the operation of the machine to create a fiber coil and insert it into a tray 23 takes 26.65 seconds when coiling the maximum three meter coil length. Of course, the invention is not limited in this respect, as various modifications can be made to the machine that will impact this timing.

When an operation begins, the conveyor mechanism (not shown) actuates for two seconds to move an empty work tray to the location of the payout and spool tool to receive a coil of fiber. At this point, the threading sequence begins. The threading gripper 13 extends from its originating position to the position adjacent the winding gripper, over a three second period. The winder 17 closes its gripper 15 in 0.75 seconds, and secures the end of the fiber that protrudes from the threading gripper 13. The threading gripper then opens in 0.75 seconds to release the fiber, and retracts linearly to its originating position in 1.5 seconds. The winding gripper 15 then retracts, with the fiber secured in its grip, in the upward vertical direction for 1 second to position the end of the fiber for the winding sequence as discussed above.

In the embodiment of the present invention described above, each of the steps is performed sequentially, such that no two actuation or movement operations are done in parallel. However, it should be appreciated that the present invention is not limited in this respect, and that some of the operations described above can be performed in parallel. For example, the movement of a tray 23 to the location under the mandrel 19 can be performed while the threading gripper 13 is handing the free end 7f of the optical fiber to the winding gripper 15, and/or while the winder 17 is winding the optical fiber about the mandrel 19. Similarly, the operation of retracting the threading gripper back to its original position after the fiber has been grasped by the winding gripper 15 can be performed in parallel with the winding gripper moving upwardly.

The winding sequence follows, and for approximately ten seconds, depending on the length of fiber to be wound for the specific application. In one embodiment, the maximum wound length of fiber is three meters, which requires eleven complete rotations of the mandrel 19 and winding gripper 15. The mandrel and winding gripper rotate in multiples of complete 360 degree rotations. Once the winding of the fiber is complete, the winding gripper 15 extends in the downward vertical direction for one second to the position from where it received the fiber from the threading gripper 13. At the same time as the winding gripper 15 extends, the mandrel pins, located on the underside of the mandrel and used to open the fiber coil holding features of the work tray, extend in one second in preparation for the coil insertion sequence.

The coil insertion sequence begins with the tray lift assembly 25 lifting the tray 23 in one and a half seconds from its originating position to close proximity with, and directly below, the mandrel 19. At this point, the inserter arms 31a extend for one and a half seconds to place the free ends of the fiber coil into the receiving features on the tray 23. At the same time that the inserter arm begins to move, the stripper 29 extends for one second to strip the fiber coil off the mandrel 19 and into the tray 23. After the fiber coil is placed into the tray 23, the threading gripper 13 closes in 0.75 seconds and grips the trailing portion of the optical fiber 107. The cutter 21 then extends in one half second and cuts the fiber, separating the wound coil of fiber from the spool 1, and leaving a trail portion of the fiber to protrude from the work tray. Once the fiber is cut, the mandrel pins retract in one half second to allow the fiber coil holding features of the work tray 23 to close on, and secure, the fiber coil in the tray. Next, the winding gripper 15 opens in one second, releasing a lead portion of the fiber coil, thus allowing this lead portion to protrude from the tray. Contemporaneous with the winding gripper opening, the stripper 29, inserter arms 31a and cutter 21 all retract in one second to their respective originating positions. Finally, the tray lift assembly retracts to its originating position, leaving the work tray 23 on the conveyor mechanism 25. This entire coil insertion sequence lasts 7.75 sec. The assembled work tray, containing the fiber coil, is then ready to be moved to subsequent tool modules.

Again, although a number of operations are described above as being performed sequentially, it should be appreciated that the present invention is not limited to operating in this manner, as any operations that are not required to be performed sequentially can be performed in parallel.

As mentioned above, in one embodiment of the present invention the fiber coil is transferred to a transport medium, one example of which is a tray 23 as described in the Work Tray Application. That work tray will now be described. However, it should be appreciated that the tray described below is merely one example of a transport medium that can be used with the embodiments of the present invention described above. The tray may be configured to transport the fiber through an automated manufacturing process, such as fiber preparation and ferrule attachment to one or both ends of an optical fiber to fabricate a fiber pigtail. The tray may also be configured to maintain one or more portions of the fiber in a desired position to facilitate the manufacturing process. The tray may protect the fiber from damage that can occur due to handling, transportation and/or storage.

The tray may include any one or more of a number of features for retaining the coiled fiber thereon. In this regard, the tray may include a containment feature, such as a receptacle, that receives the coiled fiber and maintains the fiber in a coiled position while the fiber is transported, stored and/or assembled. A locking mechanism may be provided to retain the coiled fiber in the receptacle. One or more retainers may be provided on the tray to hold one or both end portions of the fiber in a selected position, either during transportation or storage of the fiber, or during manufacturing processes on the end portion of the fiber. The retainer may be configured to hold a fiber having any one of a range of fiber diameters or ferrules of various shapes attached to the end of an optical fiber. This feature adds to the utility and convenience of the tray, since it allows the same tray to be used to transport or store fibers having different fiber diameters and/or ferrule shapes.

The tray may also include any one or more of a number of registration features configured to facilitate the handling and positioning of the tray during a manufacturing process. The registration features may be configured to mate with corresponding features provided on one or more manufacturing tools or stations to position the tray relative to the tool or station. Registration features may also be employed to cooperate with a transporter that moves the tray between multiple fiber processing stations.

While the tray is particularly suited for the fabrication, transportation and storage of an optical fiber, it is to be appreciated that the tray may be employed with any type of fiber, wire, cable or cable-like device that may need to be retained in a coiled configuration.

Figure 15:
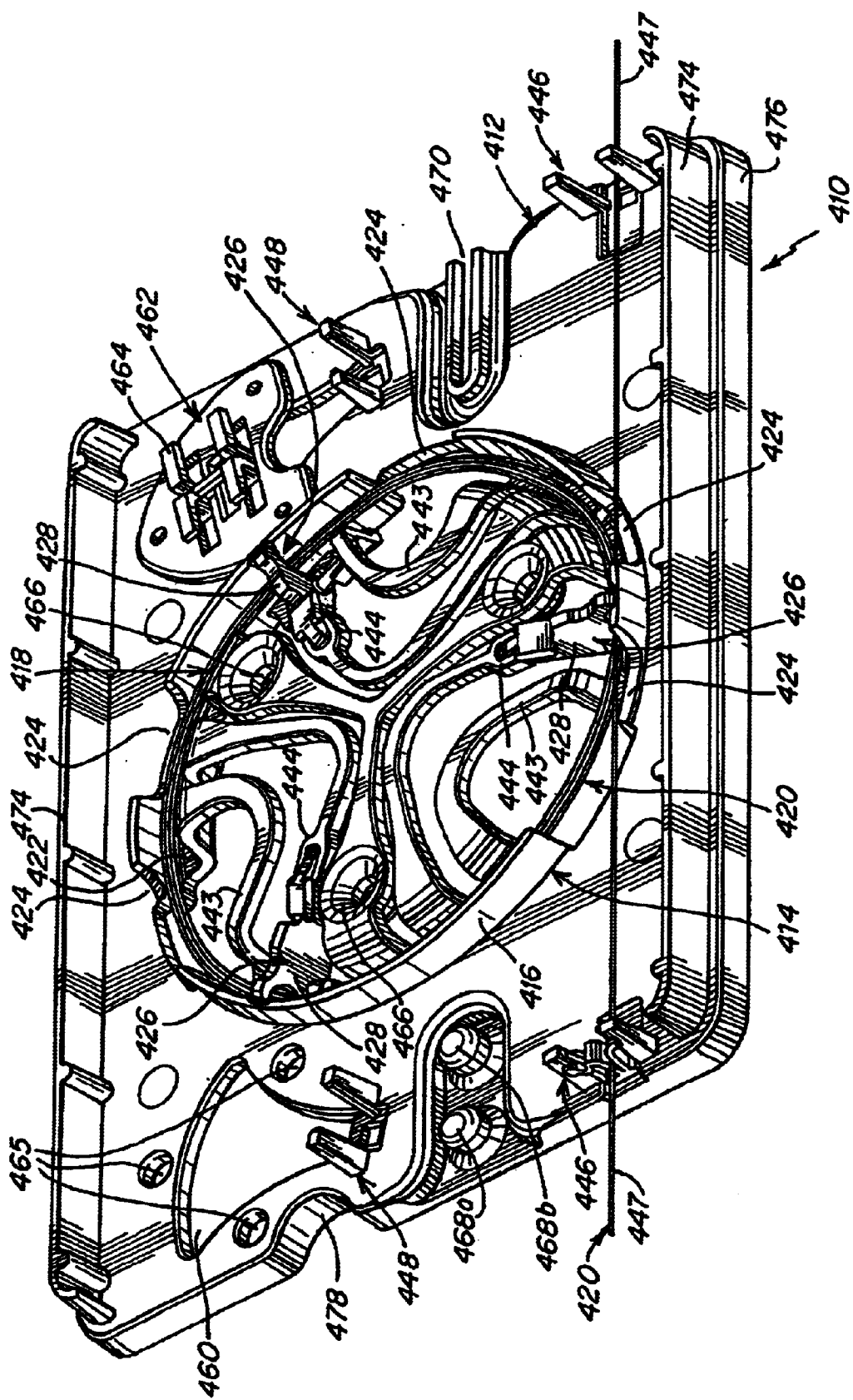
FIG. 15 is a top perspective view of a transport tray for a coiled fiber according to one illustrative embodiment of the invention.
Figure 16:
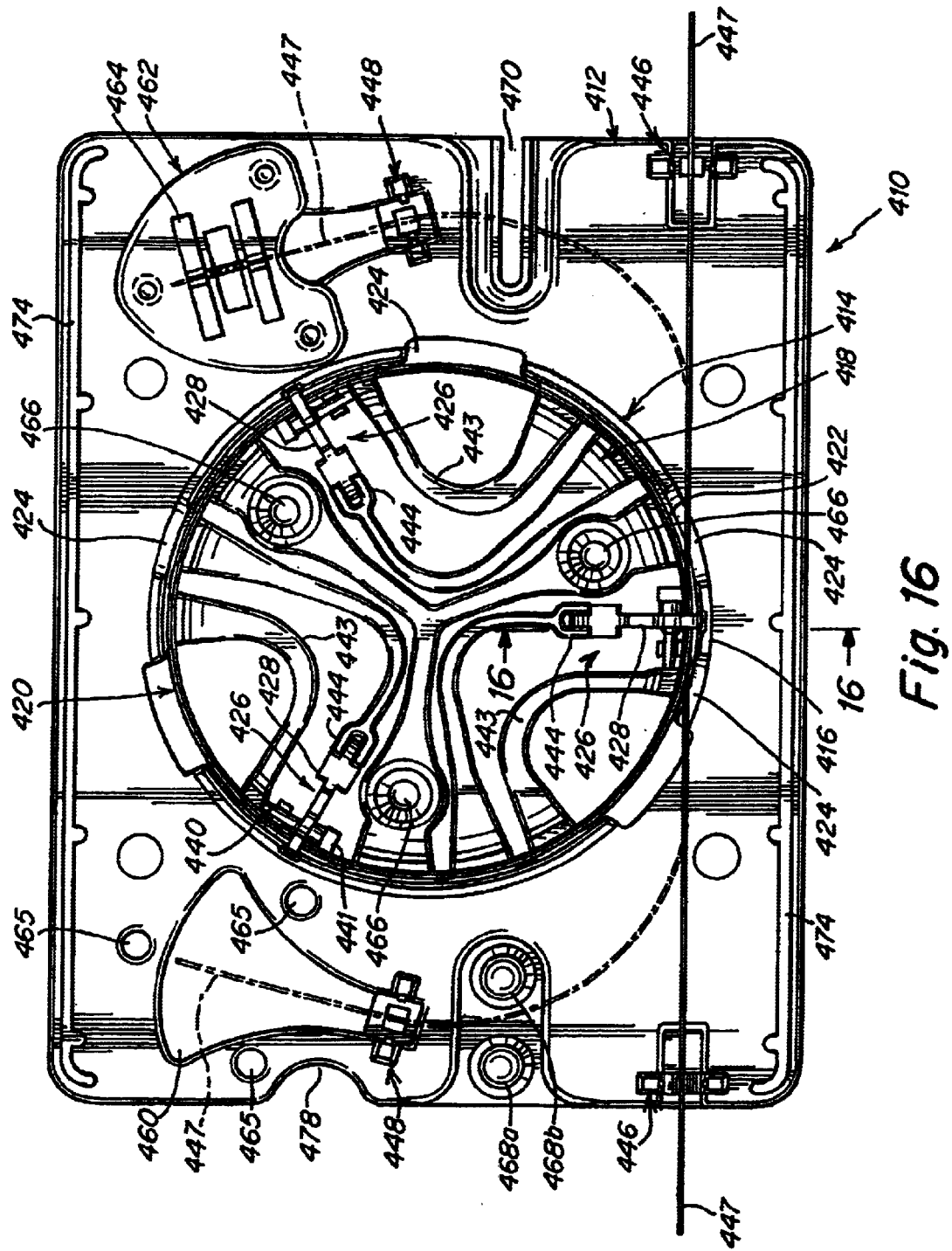
FIG. 16 is a top view of the tray of FIG. 15.

In one illustrative embodiment shown in FIGS. 15–16, the tray 410 includes a base 412 with a receptacle 414 that is configured to receive one or more coils of the fiber 420. The receptacle may be configured to receive pre-coiled coils of fiber that may be placed in the receptacle from an axial direction. Alternatively, the fiber may be coiled into the receptacle, also from an axial direction. As illustrated, the receptacle 414 has a circular shape that is configured to match the shape of the coiled fiber. In this regard, it may be desirable to configure the receptacle with a diameter that equals or exceeds a minimum bend radius allowable for the fiber. This may have particular application for an optical fiber which could be damaged should it be coiled too tightly. In one embodiment, the receptacle has a diameter of approximately 75 mm. It is to be appreciated, however, that the receptacle may be configured to have any suitable shape and size to receive a coiled fiber.

The receptacle 414 is centrally located on the base 412 and configured to position and hold the coiled fiber 420 in a known location on the base. In the illustrative embodiment, the receptacle 414 includes one or more upstanding walls 416 which provide a coil containment feature. The receptacle may also include a central hub 418 spaced inwardly from the wall to form an annular recess 422 in the base 412 that is configured to provide a secure location for the coiled fiber.

It may be desirable to allow one or both end portions of the coiled fiber to extend from the receptacle so that any of a number of various manufacturing processes may be performed on the fiber. For example, it may be desirable to prepare the end portion of an optical fiber held in the tray for attachment of a ferrule. In one embodiment illustrated in FIG. 16, the receptacle wall includes openings or breaks 424 to allow the ends of the coiled fiber to exit from the same general region of the containment receptacle. It is to be appreciated that any number of openings may be located on any desirable portion of the receptacle suitable for any particular application.

To ensure a secure attachment of the coiled fiber within the receptacle, the tray may be provided with a lock mechanism to retain the coiled fiber on the tray. The lock mechanism may be configured to be operable between an open or unlocked position and a closed or locked position. With the lock mechanism in the unlocked position, the coiled fiber may be inserted into or removed from the receptacle, while the fiber is retained in the receptacle when the lock mechanism is in the locked position.

In one illustrative embodiment shown in FIGS. 15–16, the lock mechanism 426 includes a plurality of latches 428 that are movably supported on the base of the tray. Each latch may be rotatably supported from the receptacle wall 416 so as to move toward and away from the inner surface of the receptacle wall between the locked and unlocked positions, respectively. As shown, the lock mechanism may employ three latches 428 equally spaced about the perimeter of the receptacle. It is to be appreciated, however, that any number of latches may be located as desired relative to the receptacle.

Figure 17:
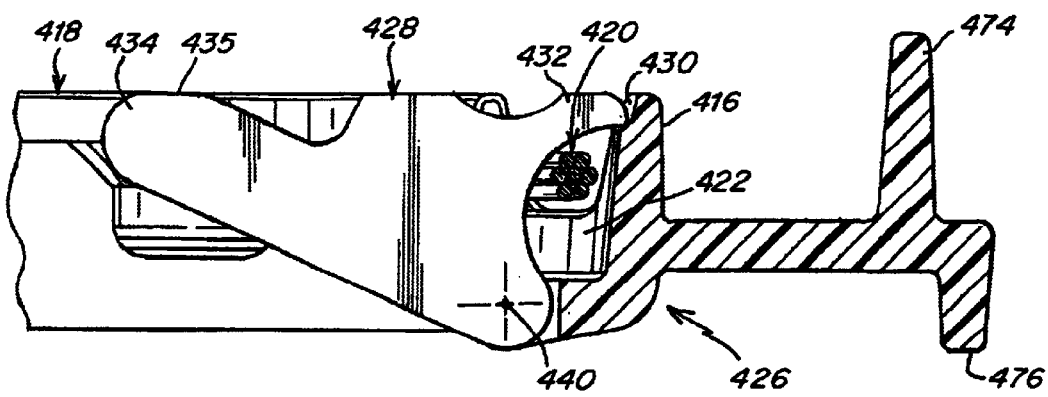
FIG. 17 is a cross-sectional view taken along section line 16—16 in FIG. 16 illustrating one embodiment of a locking mechanism in the closed position.

In the closed position as illustrated in FIG. 17, each latch 428 overlies the recess 422 and engages the inner surface of the receptacle wall 416 to retain the coiled fiber in the receptacle. A portion of the receptacle wall opposite the latch may be provided with a recess or depression 430 that is configured to receive a nose portion 432 of the latch therein to enhance the containment capability of the receptacle.

Figure 18:
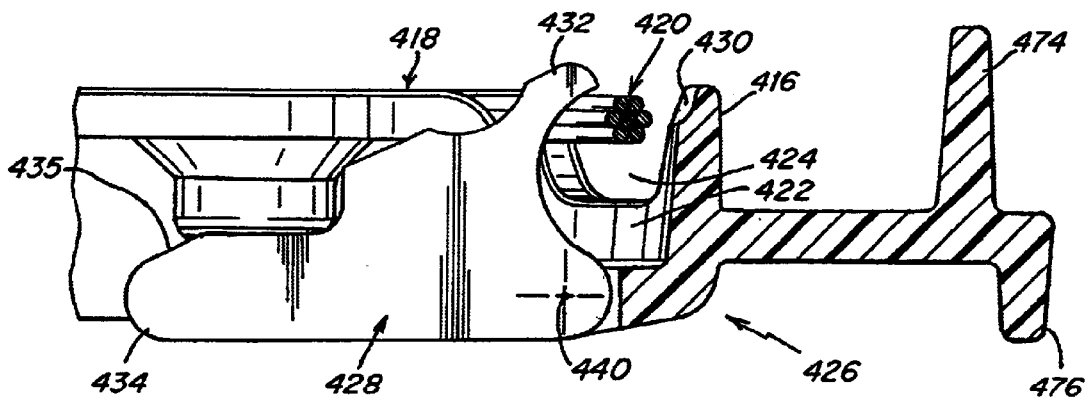
FIG. 18 is the cross-sectional view of the locking mechanism of FIG. 17 in the open position.

In the unlocked configuration as shown in FIG. 18, each latch 428 is rotated away from the inner wall to free the coiled fiber 420 from the recess 422 so that it can be removed from the receptacle. Each latch 428 may be opened by depressing a lever portion 434 of the latch either manually or with a process tool. The latch may include a camming surface 435 configured to receive pressure from an operator or process tool to rotate the latch to the open position.

Figure 19:
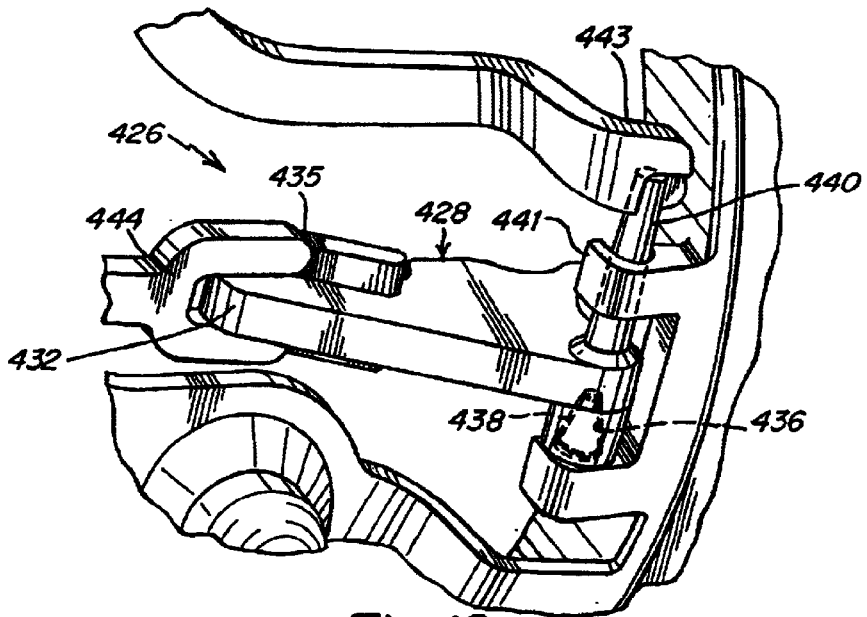
FIG. 19 is a partial, bottom perspective view of the locking mechanism.

As indicated above, each latch 428 is rotatably supported within the receptacle 414. In one illustrative embodiment shown in FIG. 19, one side of the latch includes a conical recess 436 configured to mate with a corresponding conical pin 438 extending from a support provided on the receptacle wall. The opposite side of the latch includes an elongated conical pin 440 that is journaled on a support 441 provided on the receptacle wall. The pin 440 is held in the support with a biasing member, such as a cantilevered spring 443, that engages the tip of the pin. It is to be appreciated that other connection arrangements may be employed to rotatably mount the latches to the tray.

To ensure that the latch 428 securely maintains the fiber within the receptacle, the latch may be biased toward the closed position and into engagement with the wall. In one illustrative embodiment shown in FIGS. 15–16, each latch is biased toward the closed position with a cantilevered leaf spring 443. The spring includes a U-shaped end 444 that is slidably coupled to the lever portion 432 of the latch. The spring may be configured to preload the latch to ensure that it engages the wall in the closed position with some amount of locking force.

As illustrated, the spring 443 may be curved to provide a spring length capable of generating a desired amount of spring force. The spring may also have a tapered shape along its length to distribute force evenly along the length of the spring.

Since it may be desirable to secure the end portions of the fiber to facilitate a manufacturing process, reduce potential damage to the ends and the like, the tray 410 may be provided with one or more retainers configured to hold end portions of the fiber in one or more orientations. In this regard, one or both end portions may be positioned to allow work to be done on the ends of the fiber while the remainder of the fiber is maintained in the coiled configuration, thus precluding the need to uncoil and recoil the fiber during assembly procedures. Conversely, one or both end portions may be positioned on the tray in a storage position to protect the ends from potential damage during handling, transport, storage and the like.

As shown in the illustrative embodiment, the tray 410 includes a pair of first retainers 446 and a pair of second retainers 448 positioned on the tray to hold the end portions of the fiber in one or more predetermined locations or orientations.

The first retainers 446 are aligned with each other at opposite ends of the tray to allow each end 447 of the fiber to extend outwardly from the tray. This orientation positions the fiber ends in readily accessible locations to facilitate manufacturing processes on one or both ends of the fiber. For some applications, the tray may be positioned so that the same or different processes may be performed simultaneously on both ends of the fiber. For an optical fiber, this orientation may be suitable for stripping, cleaning, cleaving, ferrule attachment and the like to the ends of the fiber.

The second retainers 448 are positioned on the tray base at an orientation that differs from the first retainers 446 to maintain the fiber ends 447 within the confines of the tray (shown in phantom). In one embodiment, the second retainers are located on the base of the tray such that the minimum bend radius of the fiber is maintained when the end of the coil extends from the receptacle 414 to the retainer 448. The minimum bend radius of the fiber may thus, at least to a certain degree, dictate the size of the tray, and also define the location and angular orientation of the retainers. The second retainers 448 are particularly suited to storing the end portions 447 of the fiber on the tray to reduce the possibility of damaging the fiber ends during handling, transportation, storage and the like. It is to be understood that the number and location of retainers may vary to suit any desirable application.

Each retainer 446, 448 may be configured to hold a fiber having any one of a range of diameters. This feature provides flexibility and allows the same tray to be used in many different applications for various fibers. For example, one application in which the tray may be particularly useful is the preparation of coiled optical fiber. At present, the industry uses several standard optical fibers having diameters ranging from 180 $\mu$m to 900 $\mu$m. It is desirable that the same tray may be used to transport or store any of these fibers. Therefore, the retainer is configured to accommodate a range of diameters.

In one illustrative embodiment shown in FIG. 20, the retainer includes a spring-type clip 450 that is attached to the base between a pair of opposing posts 452. The clip includes a pair of resilient legs 451 arranged in a generally V-shaped configuration. The upper ends of the legs 451 press against the posts 452 to urge the legs toward each other to grip a fiber placed between them. The resiliency of the legs allows the retainer to grasp fibers having any of a range of outer diameters with sufficient force to secure them in the retainer while also limiting potential damage to the fiber. The clip 450 may be a detachable part configured to be plugged into a hole in the base between the posts.

Since it may be desirable to limit the number of separate components for the tray, the retainers 446, 448 may be integrally formed with the base of the tray. In one illustrative embodiment shown in FIG. 21, the retainer includes a tapered notch 454 integrally formed between the posts 452. The retainer includes opposing sidewalls that converge toward each other from the top end of the posts toward the bottom end of the posts to form the notch.

As illustrated, the taper may be non-uniform and become steeper at the lower portion. This allows for more secure holding of narrower fibers. In one embodiment, the walls 456 along the upper portion of the notch may be angled approximately 12° relative to a vertical line through the center of the notch, while the walls 548 along its lower portion may be angled approximately 8° from the vertical line. These exemplary angles may be suitable for constraining fibers having an outer diameter from approximately 180 $\mu$m to approximately 900 $\mu$m. It is to be appreciated that retainers having any suitable configuration may be employed to secure the fiber ends in the tray.

While the second retainers position the end portions of the fiber within the tray for protection, the fiber ends may nevertheless be susceptible to damage. For example, the end of an optical fiber may become scratched, chipped or suffer other damage from contact with the tray. Thus, it may be desirable to configure the tray to avoid contact with the fiber end.

In one illustrative embodiment shown in FIGS. 15–16, the tray includes an aperture 460 in the base located proximate to the second retainer 448. The aperture allows the fiber end 447 extending beyond the retainer to "float" without contacting the base of the tray. As shown, aperture 460 may be bell-shaped or cone-shaped, to allow for movement of the end of the fiber extending beyond the retainer. It is to be appreciated, however, that the aperture may be any desired shape.

For some applications, it may be desirable to further secure the fiber ends to the tray, rather than allowing the end to float. For example, due to the added weight of a ferrule, it may be advantageous to secure the ferrule to the tray. In one illustrative embodiment, a fiber end retainer 462 may be provided adjacent one or both of the second retainers 448 to secure that portion of the fiber end 447 extending beyond the second retainer. The fiber end retainer 462 may include a clip 464 that is configured to retain the fiber end and or ferrule attached to the fiber end. The retainer 462 may be attached to the base using one or more snaps, studs, or other suitable fastener that is configured to mate with a corresponding feature, such as a hole 465, on the base of the tray. As shown, the fiber end retainer 462 may be adapted to fit over the aperture 460 described above. It is to be appreciated that the fiber end retainer may be attached to the tray using any suitable fastening arrangement and it may be configured to accommodate a fiber end and/or ferrule having any shape and/or size.

Since fibers and/or ferrules have various shapes and sizes, the tray may be provided with at least two interchangeable retainers 462 that are detachably supported on the base of the tray. Depending on the size or shape of the fiber or component, such as a ferrule, attached to the fiber end, one of the retainers may be selectively attached to the base. Any number of interchangeable retainers may be provided to accommodate a variety of shapes and sizes of fibers and ferrules, which allows the same tray to be used in any number of applications.

To enhance the utility of the tray for one or more manufacturing applications, the tray may be provided with one or more registration features to facilitate handling, positioning and/or maintaining the tray, and a coiled fiber contained thereon, in a desired location. For example, the registration features may be provided to align and mate the receptacle with a fiber spooling and insertion tool as discussed above. Other examples include, but are not limited to, registration features for positioning and maintaining the tray at one or more various manufacturing stations, and coupling the tray to a transporter that carries the tray between various locations.

In one illustrative embodiment, the tray includes a plurality of receptacle registration features 466 located on the central hub of the receptacle that are configured to cooperate with corresponding features on a fiber spooling and insertion tool to facilitate transfer of coiled fiber from the tool to the receptacle. As shown, three registration features are arranged in a triangular configuration. The receptacle registration features 466 are configured as upwardly facing recesses having a funnel or frusto-conical shape to facilitate mating with corresponding conical pins on the tool (e.g., the tray locator pins 209 (FIG. 7a) on the mandrel 119). It is to be appreciated, however, that any number of registration features may be provided having any shape and arrangement as desired.

As indicated above, the tray may also include one or more registration features for transporting and positioning the tray at one or more process tools. In one illustrative embodiment, the tray includes a pair of registration holes 468a, 468b at one end and an elongated slot 470 at the other end of the base that are linearly aligned with each other. The slot 470 provides some flexibility in the registration and prevents the tray from being over-constrained. The outer hole 468a and slot 470 may be employed to position the tray relative to a process tool, while the inner hole 468b may cooperate with the slot 470 for transporting the tray between various process tools. The holes and slot are configured as downwardly facing recesses having a funnel or frusto-conical shape to facilitate mating with corresponding pins on a locating and/or transporting device. This feature allows the tray to be positioned accurately with respect to one or more tools that perform operations on the ends of the fiber. It is to be understood that any number and arrangement of registration features having any suitable shape may be implemented on the tray.

The tray may be provided with a stacking feature to facilitate manufacturing processes and/or storage by allowing a plurality of trays to be stacked on top of one another. In one illustrative embodiment, the tray includes one or more upstanding ribs 474 along the perimeter of the base and a complementary skirt 476 extending downwardly from the perimeter of the base. The skirt 476 is configured to mate with and rest on the upstanding ribs 474 of an adjacent tray. The skirt and ribs may also be configured to interlock in a manner that reduces movement between stacked trays.

Since the tray, as illustrated, has an asymmetrical configuration, it may be desirable to provide a keying feature to ensure that the tray is properly oriented during a manufacturing process. In one embodiment, the tray includes a key 478 in the form of a semi-circular relief along one end of the base. The key 478 ensures that the tray is positioned in a particular orientation when used in conjunction with a tool having a corresponding keying feature. Of course, the tray may incorporate any suitable keying feature.

The tray may be formed from a material capable of withstanding relatively high temperatures, for example up to 150° C., since for some applications, such as optical fiber preparation and assembly, the tray may need to be subjected to high temperatures to set and cure an adhesive employed to attach a component, such as a ferrule, to the fiber. It may also be desirable to use a material that is resistant to various process chemicals and/or meets industry standards regarding electrostatic discharge (ESD). The retainers may be formed from the same or a more compliant material for accommodating various shapes and sizes of fiber and ferrules while also reducing potential damage to the components. In one embodiment, the tray is injection molded from a carbon-filled polysulfone plastic material and the plug-in retainers 450, 462 are molded from a copolyester elastomer, such as Arnitel UM551 available from DSM Engineering Plastics. It is to be appreciated, however, that the tray and retainers may be formed of any suitable material using any manufacturing process.

As illustrated, the tray may have a rectangular base configuration with the circular receptacle centrally located on the base. In one embodiment, the tray has a width of approximately 4.5 inches, a length of approximately 6.0 inches and a height of approximately 0.5 inches. The tray is also configured with a stackable pitch distance of approximately 0.375 inches. It should be understood that the tray may be configured to have any suitable size and shape for an application.

Having described several illustrative embodiments of the invention in detail, various modifications and improvements will readily occur to those skilled in the art. Such modifications and improvements are intended to be within the scope of the invention. Accordingly, the foregoing description is by way of example only and is not intended as limiting. The invention is limited only as defined by the following claims and the equivalents thereto.

What is claimed is:

1. A method for processing an optical fiber, the method comprising acts of:
    (A) automatically unwinding a section of optical fiber from a spool of optical fiber;
    (B) automatically cutting the section of optical fiber to separate the section from the spool;
    (C) automatically winding the section of optical fiber about a continuously curved winding surface to form a coil; and
    (D) automatically transferring the coil to a transport medium;

wherein the act (D) comprises acts of:
automatically stripping the coil from the winding surface; and
automatically inserting the coil in the transport medium, and
wherein the act (D) is performed without gripping the section of optical fiber.

2. The method of claim 1, wherein the act (C) comprises an act of automatically winding the section of optical fiber about a mandrel having an axis; and
wherein the method further comprises an act of stripping the coil from the mandrel by moving the coil relative to the mandrel in a direction of the mandrel axis.

3. The method of claim 2, wherein the act (C) comprises an act of automatically winding the section of optical fiber about a mandrel that is rotatable about the axis.

4. The method of claim 1, wherein the act (D) comprises an act of automatically aligning the winding surface with the transport medium.

5. The method of claim 1, wherein the act (D) comprises acts of:
transferring the coil to a transport medium having at least one moveable engagement feature that secures the coil to the transport medium; and
automatically actuating the at least one moveable engagement feature.

6. The method of claim 1, wherein the act of automatically stripping the coil from the winding surface comprises an act of contacting the coil with a stripper that has a contour that matches the winding surface about an entire circumference of the winding surface.

7. The method of claim 6, wherein the winding surface is cylindrical, wherein the act (C) comprises an act of automatically winding the section of optical fiber about the winding surface, and wherein the act of automatically stripping the coil from the winding surface comprises an act of contacting the coil with a stripper comprising a cylindrical sleeve.

8. The method of claim 1, wherein the act of automatically stripping the coil from the winding surface comprises an act of applying equal stripping force to the coil about an entire circumference of the winding surface to strip the coil from the winding surface.

9. The method of claim 1, wherein the act (D) comprises an act of automatically moving at least one of the winding surface and the transport medium toward the other to facilitate transferring the coil to the transport medium.

10. A method for processing an optical fiber, the method comprising acts of:
(A) automatically unwinding a section of optical fiber from a spool of optical fiber;
(B) automatically cutting the section of optical fiber to separate the section from the spool;
(C) automatically winding the section of optical fiber about a continuously curved winding surface to form a coil; and
(D) automatically transferring the coil to a transport medium;
wherein the act (D) comprises an act of automatically moving at least one of the winding surface and the transport medium toward the other to facilitate transferring the coil to the transport medium; and
wherein the act (C) comprises an act of automatically winding the section of optical fiber about a mandrel that comprises the continuously curved winding surface, and wherein the act (D) comprises an act of mating the transport medium with the mandrel to facilitate transferring the coil to the transport medium.

11. The method of claim 10, wherein the act (D) comprises an act of transferring the coil to the transport medium having at least one engagement feature that grasps the coil to secure the coil to the transport medium.

12. An apparatus for processing an optical fiber, the apparatus comprising:
a payout assembly to unwind a section of optical fiber from a spool of optical fiber;
a cutter to cut the section of optical fiber to separate the section from the spool;
means for automatically winding the section of optical fiber about a continuously curved winding surface to form a coil;
transfer means for automatically transferring the coil to a transport medium; and
means for automatically mating the winding surface with the transport medium.

13. The apparatus of claim 12, wherein the winding surface is sized and shaped to ensure that a minimum bending radius of the optical fiber is not violated when the section of optical fiber is wound about the winding surface.

14. The apparatus of claim 12, wherein the means for automatically winding comprises a winder that winds the section of optical fiber to form a coil, wherein the winder comprises a rotatable mandrel that comprises the winding surface and a gripper, spaced from the winding surface, that is rotatable with the mandrel and that grips the section of optical fiber and winds the section of optical fiber about the winding surface.

15. The apparatus of claim 12, further comprising:
a stripper that strips the coil from the winding surface; and
an inserter that inserts the coil in a transport medium.

16. The apparatus of claim 15, wherein stripper and the inserter are both movable in a same direction relative to the winding surface.

17. The apparatus of claim 15, further comprising a base to receive the transport medium, and wherein at least one of the winding surface and the base is movable toward the other to facilitate transferring the coil to the transport medium.

18. The apparatus of claim 12, in combination with the optical fiber.

19. An apparatus for processing an optical fiber, the apparatus comprising:
a payout assembly to unwind a section of optical fiber from a spool of optical fiber;
a cutter to cut the section of optical fiber to separate the section from the spool;
a winder that winds the section of optical fiber to form a coil, the winder comprising a continuously curved winding surface;
a stripper that strips the coil from the winding surface; and
an inserter that inserts the coil in a transport medium,
wherein the stripper and the inserter both are gripper-less and have contact surfaces that do not grip the section of optical fiber.

20. The apparatus of claim 19, wherein the winder comprises a mandrel having an axis, and wherein the stripper and the mandrel are arranged for relative movement in a direction parallel to the axis.

21. The apparatus of claim 20, wherein the mandrel is rotatable about the axis.

22. The apparatus of claim 19, in combination with the optical fiber.

23. An apparatus for processing an optical fiber, the apparatus comprising:
a payout assembly to unwind a section of optical fiber from a spool of optical fiber;
a cutter to cut the section of optical fiber to separate the section from the spool;
a winder that winds the section of optical fiber to form a coil, the winder comprising a continuously curved winding surface;
a stripper that strips the coil from the winding surface; and
an inserter that inserts the coil in a transport medium;
wherein the winder comprises at least one alignment feature that is adapted to mate with a corresponding feature on the transport medium.

24. The apparatus of claim 23, in combination with the transport medium.

25. The combination of claim 24, wherein transport medium has at least one moveable engagement feature that is adapted to secure the coil to the transport medium; and
wherein the inserter comprises at least one actuator to actuate the at least one moveable engagement feature.

26. The combination of claim 24, wherein the transport medium has at least one engagement feature adapted to grasp the coil to secure the coil to the transport medium.

27. The apparatus of claim 23, wherein the stripper has a contour that matches a contour of the winding surface about an entire circumference of the winding surface.

28. The apparatus of claim 23, wherein the winding surface is cylindrical, and wherein the apparatus further comprises a cylindrical stripper that strips the coil from the winding surface.

29. The apparatus of claim 23, wherein the stripper is adapted to apply equal stripping force to the coil about the an entire circumference of the winding surface.

30. The apparatus of claim 23, in combination with the optical fiber.

31. A method for processing an optical fiber, the method comprising acts of:
(A) automatically unwinding a section of optical fiber from a spool of optical fiber;
(B) automatically cutting the section of optical fiber to separate the section from the spool;
(C) automatically winding the section of optical fiber about a winding surface to form a coil; and
(D) automatically transferring the coil to a transport medium by automatically stripping the coil from the winding surface and automatically inserting the coil in the transport medium without gripping the section of optical fiber.

32. The method of claim 31, wherein the winding surface is cylindrical, wherein the act (C) comprises an act of automatically winding the section of optical fiber about the cylindrical winding surface, and wherein the act (D) comprises an act of contacting the coil with a stripper comprising a cylindrical sleeve.

33. The method of claim 31, wherein the act (C) comprises an act of automatically winding the section of optical fiber about the winding surface that is sized and shaped to ensure that a minimum bending radius of the optical fiber is not violated in forming the coil.

34. The method of claim 31, wherein the act (D) comprises an act of moving the coil in a single direction to perform both the acts of automatically stripping the coil from the winding surface and automatically inserting the coil in the transport medium.

35. The method of claim 31, wherein the act (C) comprises an act of automatically winding the section of optical fiber about a mandrel having an axis; and
wherein the act (D) comprises an act of stripping the coil from the mandrel by moving the coil relative to the mandrel in a direction of the mandrel axis.

36. The method of claim 31, wherein the act (D) comprises an act of automatically aligning the winding surface with the transport medium.

37. The method of claim 31, wherein the transport medium has at least one moveable engagement feature that secures the coil to the transport medium, wherein the act (D) comprises acts of:
transferring the coil to the transport medium; and
automatically actuating the at least one moveable engagement feature.

38. The method of claim 31, wherein the act (D) comprises an act of automatically moving at least one of the winding surface and the transport medium toward the other to facilitate transferring the coil to the transport medium.

39. The method of claim 38, wherein the act (C) comprises an act of automatically winding the section of optical fiber about a mandrel that comprises the winding surface, and wherein the act (D) comprises an act of mating the transport medium with the mandrel to facilitate transferring the coil to the transport medium.

40. An apparatus for processing an optical fiber, the apparatus comprising:
a payout assembly to unwind a section of optical fiber from a spool of optical fiber;
a cutter to cut the section of optical fiber to separate the section from the spool;
a winder that winds the section of optical fiber about a winding surface to form a coil;
a stripper that strips the coil from the winding surface; and
an inserter that inserts the coil in a transport medium;
wherein the stripper and the inserter both are gripper-less and have contact surfaces that do not grip the section of optical fiber.

41. The apparatus of claim 40, wherein the winding surface is sized and shaped to ensure that a minimum bending radius of the optical fiber is not violated when the section of optical fiber is wound about the winding surface.

42. The apparatus of claim 40, wherein the stripper and the inserter are both movable in a same direction relative to the winding surface.

43. The apparatus of claim 40, in combination with the transport medium.

44. The apparatus of 43, further comprising a base to receive the transport medium, and wherein at least one of the winding surface and the base is movable toward the other to facilitate transferring the coil to the transport medium.

45. The apparatus of claim 40, wherein the winding surface is cylindrical, and wherein the apparatus further comprises a cylindrical stripper that strips the coil from the winding surface.

46. The apparatus of claim 40, in combination with the optical fiber.

47. An apparatus for processing an optical fiber, the apparatus comprising:
a payout assembly to unwind a section of optical fiber from a spool of optical fiber;
a cutter to cut the section of optical fiber to separate the section from the spool;
a winder that winds the section of optical fiber to form a coil, the winder comprising a winding surface;

a stripper that strips the coil from the winding surface; and
an inserter that inserts the coil in a transport medium;

wherein stripper and the inserter are both movable in a same direction relative to the winding surface; and wherein the stripper and the inserter both are gripper-less and have contact surfaces that do not grip the section of optical fiber.

48. The apparatus of claim 47, wherein the winder comprises a mandrel having an axis, and wherein the stripper and the mandrel are arranged for relative movement in a direction parallel to the axis.

49. The apparatus of claim 47, in combination with the optical fiber.

50. A method for processing an optical fiber, the method comprising acts of:
(A) automatically unwinding a section of optical fiber from a spool of optical fiber;
(B) automatically cutting the section of optical fiber to separate the section from the spool;
(C) automatically winding the section of optical fiber about a winding surface to form a coil; and
(D) automatically transferring the coil from the winding surface to a transport medium, including acts of;
automatically stripping the coil from the winding surface;
automatically moving at least one of the winding surface and the transport medium toward the other to facilitate transferring the coil to the transport medium; and
automatically inserting the coil in the transport medium;
wherein the act (D) comprises an act of mating the transport medium with the winding surface to facilitate transferring the coil to the transport medium.

51. The method of claim 50, wherein the act (D) comprises an act of automatically aligning the winding surface with the transport medium.

52. The method of claim 50, wherein the transport medium has at least one moveable engagement feature that secures the coil to the transport medium, wherein the act (D) comprises acts of:
transferring the coil to the transport medium; and
automatically actuating the at least one moveable engagement feature.

53. The method of claim 50, wherein the transport medium has at least one engagement feature that grasps the coil to secure the coil to the transport medium, wherein the act (C) includes an act of automatically winding the section of optical fiber about a winding surface to form a coil having a coiled section and a pair of free ends; and wherein the act (D) comprises an act of transferring the coil to the transport medium.

54. The method of claim 50, wherein the act (C) comprises an act of automatically winding the section of optical fiber about a mandrel that comprises the winding surface, and wherein the act (D) comprises an act of mating the transport medium with the mandrel to facilitate transferring the coil to the transport medium.

55. The method of claim 50, wherein the act (D) comprises an act of moving the coil in a single direction to perform both the acts of automatically stripping the coil from the winding surface and automatically inserting the coil in the transport medium.

56. A method for processing an optical fiber, the method comprising acts of:
(A) automatically unwinding a section of optical fiber from a spool of optical fiber;
(B) automatically cutting the section of optical fiber to separate the section from the spool;
(C) automatically winding the section of optical fiber about a winding surface to form a coil; and
(D) automatically transferring the coil from the winding surface to a transport medium, including acts of;
automatically stripping the coil from the winding surface;
automatically moving at least one of the winding surface and the transport medium toward the other to facilitate transferring the coil to the transport medium; and
automatically inserting the coil in the transport medium; and
wherein the act (D) is performed without gripping the section of optical fiber.

57. The method of claim 56, wherein the act (C) comprises an act of automatically winding the section of optical fiber about a mandrel having an axis; and
wherein act (D) comprises an act of stripping the coil from the mandrel by moving the coil relative to the mandrel in a direction of the mandrel axis.

58. The method of claim 56, wherein the act of automatically stripping the coil from the winding surface comprises an act of contacting the coil with a stripper that has a contour that matches the winding surface about an entire circumference of the winding surface.

59. An apparatus for processing an optical fiber, the apparatus comprising:
a payout assembly to unwind a section of optical fiber from a spool of optical fiber;
a cutter to cut the section of optical fiber to separate the section from the spool;
a winder that winds the section of optical fiber to form a coil, the winder comprising a winding surface;
a stripper that strips the coil from the winding surface;
an inserter that inserts the coil in a transport medium; and
a base to support the transport medium;
wherein at least one of the winding surface and the base is movable toward the other to facilitate transferring the coil to the transport medium; and
wherein the winder comprises at least one alignment feature that is adapted to mate with a corresponding feature on the transport medium.

60. The apparatus of claim 59, in combination with the transport medium.

61. The combination of claim 60, wherein transport medium has at least one moveable engagement feature that is adapted to secure the coil to the transport medium; and
wherein the inserter comprises at least one actuator to actuate the at least one moveable engagement feature.

62. The combination of claim 60, wherein the winder that winds the section of optical fiber about the winding surface to form a coil having a coiled section and a pair of free ends; and
wherein the transport medium comprises an engagement feature that engages the coiled section to secure the coil to the transport medium.

63. The apparatus of claim 59, wherein stripper and the inserter are both movable in a same direction relative to the winding surface.

64. The apparatus of claim 59, in combination with the optical fiber.

65. An apparatus for processing an optical fiber, the apparatus comprising:
a payout assembly to unwind a section of optical fiber from a spool of optical fiber;

a cutter to cut the section of optical fiber to separate the section from the spool;

a winder that winds the section of optical fiber to form a coil, the winder comprising a winding surface;

a stripper that strips the coil from the winding surface;

an inserter that inserts the coil in a transport medium; and a base to support the transport medium;

wherein at least one of the winding surface and the base is movable toward the other to facilitate transferring the coil to the transport medium; and wherein the stripper and the inserter both are gripper-less and have contact surfaces that do not grip the section of optical fiber.

66. The apparatus of claim 65, wherein the winder comprises a mandrel having an axis, and wherein the stripper and the mandrel are arranged for relative movement in a direction parallel to the axis.

67. The apparatus of claim 65, in combination with the optical fiber.

* * * * *